(12) United States Patent
Sahota et al.

(10) Patent No.: US 10,902,356 B2
(45) Date of Patent: Jan. 26, 2021

(54) REAL-TIME COGNITIVE SUPPLY CHAIN OPTIMIZATION

(71) Applicant: International Business Machines Corporation, Armonk, NY (US)

(72) Inventors: Neil Sahota, Costa Mesa, CA (US); Joseph Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 15/697,882

(22) Filed: Sep. 7, 2017

(65) Prior Publication Data

US 2019/0073611 A1    Mar. 7, 2019

(51) Int. Cl.
*G06Q 10/04* (2012.01)
*G06Q 10/08* (2012.01)

(52) U.S. Cl.
CPC .......... *G06Q 10/047* (2013.01); *G06Q 10/08* (2013.01)

(58) Field of Classification Search
CPC ....... G06Q 10/047; G06Q 10/08; G01C 21/00
USPC ........................................................ 705/338
See application file for complete search history.

(56) References Cited

U.S. PATENT DOCUMENTS

| | | |
|---|---|---|
| 6,259,988 B1 | 7/2001 | Galkowski et al. |
| 2007/0073480 A1* | 3/2007 | Singh ................. G01C 21/3484 |
| | | 701/420 |
| 2011/0087429 A1* | 4/2011 | Trum .................... G01C 21/32 |
| | | 701/533 |
| 2011/0246067 A1* | 10/2011 | Markham .......... G01C 21/3492 |
| | | 701/414 |

(Continued)

FOREIGN PATENT DOCUMENTS

WO    2014178055 A1    11/2014

OTHER PUBLICATIONS

Letchner et. al., "Trip Router with Individualized Preferences (TRIP): Incorporating Personalization into Route Planning", Conference: Proceedings, The Twenty-First National Conference on Artificial Intelligence and the Eighteenth Innovative Applications of Artificial Intelligence Conference, Jul. 16 (Year: 2006).*

(Continued)

*Primary Examiner* — Kevin H Flynn
*Assistant Examiner* — Emmett K. Walsh
(74) *Attorney, Agent, or Firm* — Peter Edwards

(57) ABSTRACT

The present invention provides a method, system, and computer program product of real-time cognitive supply chain optimization. In an embodiment, the present invention includes receiving supply chain optimization data describing a supply chain optimization problem, receiving variables of interest data describing variables of interest with respect to the supply chain optimization problem, generating an optimal route for a user based on the supply chain optimization data and the variables of interest data, monitoring route execution data describing execution of the generated optimal route by the user, capturing deviation data from the monitored route execution data, with respect to critical variable data, and executing a set of logical operations analyzing the captured deviation data with respect to the variables of interest data to identify whether at least one change occurred among the variables of interest at the time of at least one deviation from the generated optimal route.

20 Claims, 9 Drawing Sheets

(56) References Cited

U.S. PATENT DOCUMENTS

| | | | |
|---|---|---|---|
| 2012/0253661 A1* | 10/2012 | Tuukkanen | G01C 21/3492 701/423 |
| 2013/0179067 A1 | 7/2013 | Trowbridge et al. | |
| 2015/0260531 A1* | 9/2015 | Ehsani | G01C 21/3461 701/538 |
| 2016/0048648 A1 | 2/2016 | Sanchez et al. | |
| 2016/0109251 A1 | 4/2016 | Thakur | |
| 2017/0307391 A1 | 10/2017 | Mason et al. | |
| 2018/0003516 A1* | 1/2018 | Khasis | G06Q 10/1097 |

OTHER PUBLICATIONS

"Accelerated Examination Support Document," International Business Machines Corporation, dated Feb. 20, 2018, 32 pages.

Sahota et al., "Real-Time Cognitive Supply Chain Optimization," U.S. Appl. No. 15/697,882, filed Feb. 20, 2018.

List of IBM Patents or Patent Applications Treated as Related, dated Feb. 20, 2018, 2 pages.

Unknown, "Dynamic Logistics Route Provisioning," An IP.com Prior Art Database Technical Disclosure, Electronic Publication Date Apr. 21, 2015, IP.com No. IPCOM000241370D, 3 pages.

Unknown, "Method and System for Predicting and Recommending Drone Travel Routes based on Historical Data and Real-time Data Feeds," An IP.com Prior Art Database Technical Disclosure, Electronic Publication Date May 18, 2015, IP.com No. IPCOM000241624D, 4 pages.

Unknown, "Method and System for Cognitive Vehicle Route Recommendation System," An IP.com Prior Art Database Technical Disclosure, Electronic Publication Date Oct. 10, 2016, IP.com No. IPCOM000247892D, 4 pages.

Goldstein, "To Increase Productivity, UPS Monitors Drivers' Every Move," Planet Money, Apr. 17, 2014, 8 pages http://www.npr.org/sections/money/2014/04/17/303770907/to-increase-productivity-ups-monitors-drivers-every-moveSummary.

Neaga et al., "Cloud Enabled Big Data Business Platform for Logistics Services: A Research and Development Agenda," Big Data Paper, printed Sep. 7, 2017, 12 pages.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

REAL-TIME COGNITIVE SUPPLY CHAIN OPTIMIZATION

BACKGROUND

The present disclosure relates to supply chain optimization, and more specifically, to real-time cognitive supply chain optimization.

SUMMARY

The present invention provides a computer implemented method, a system, and a computer program product of real-time cognitive supply chain optimization. In an exemplary embodiment, the computer implemented method, the system, and the computer program product include (1) receiving, by a computer system, supply chain optimization data describing a supply chain optimization problem, (2) receiving, by the computer system, variables of interest data describing variables of interest with respect to the supply chain optimization problem, (3) generating, by the computer system, an optimal route for a user based on the supply chain optimization data and the variables of interest data, resulting in a generated optimal route, (4) monitoring, by the computer system, route execution data describing execution of the generated optimal route by the user, resulting in monitored route execution data, (5) capturing, by the computer system, deviation data from the monitored route execution data, with respect to critical variable data, where the deviation data describes at least one deviation taken by the user from the generated optimal route, resulting in captured deviation data, and (6) executing, by the computer system, a set of logical operations analyzing the captured deviation data with respect to the variables of interest data to identify whether at least one change occurred among the variables of interest at the time of the at least one deviation.

DETAILED DESCRIPTION

Figure 1A:
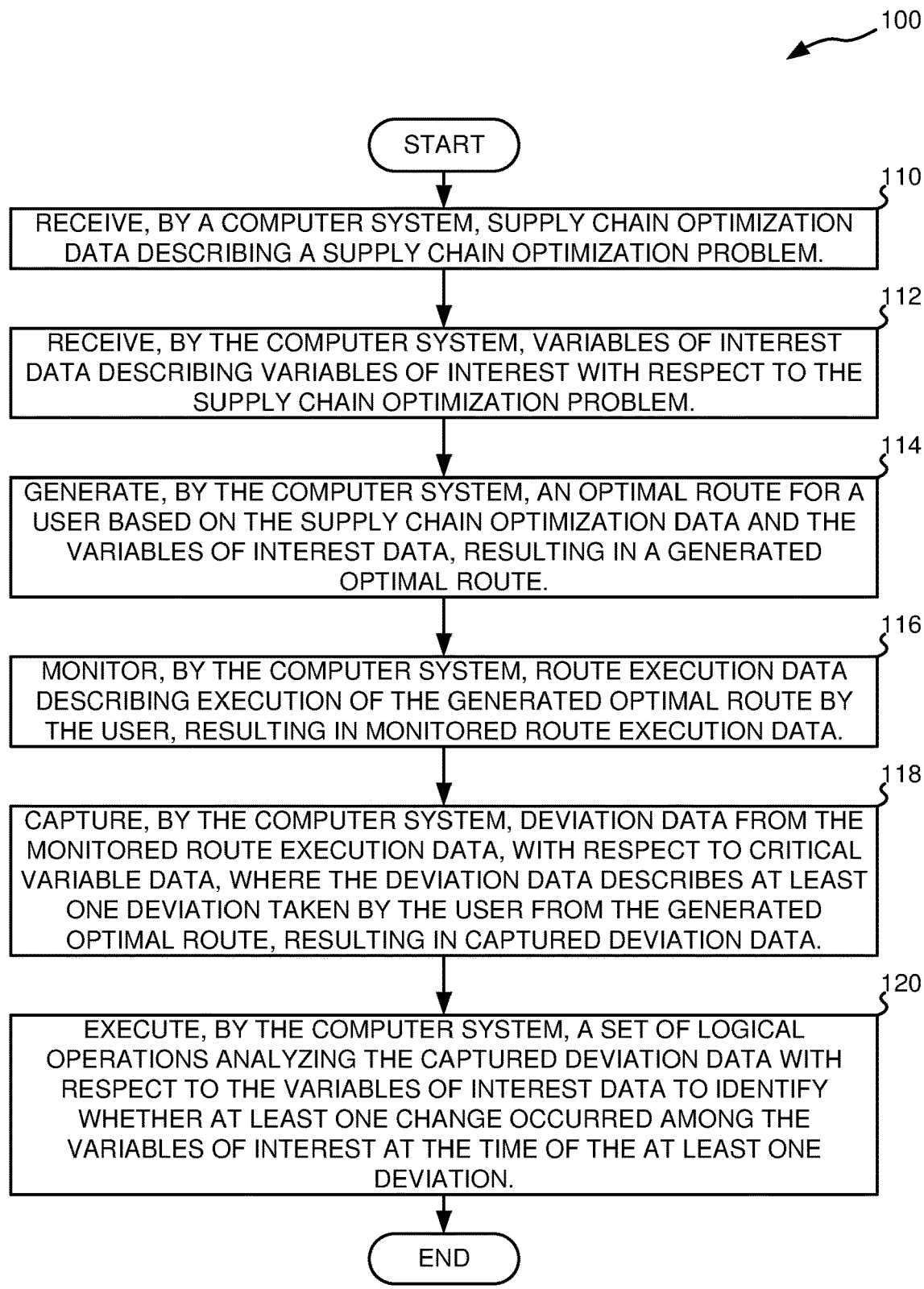
FIG. 1A depicts a flowchart in accordance with an exemplary embodiment of the present invention.

The present invention provides a computer implemented method, a system, and a computer program product of real-time cognitive supply chain optimization. In an exemplary embodiment, the computer implemented method, the system, and the computer program product include (1) receiving, by a computer system, supply chain optimization data describing a supply chain optimization problem, (2) receiving, by the computer system, variables of interest data describing variables of interest with respect to the supply chain optimization problem, (3) generating, by the computer system, an optimal route for a user based on the supply chain optimization data and the variables of interest data, resulting in a generated optimal route, (4) monitoring, by the computer system, route execution data describing execution of the generated optimal route by the user, resulting in monitored route execution data, (5) capturing, by the computer system, deviation data from the monitored route execution data, with respect to critical variable data, where the deviation data describes at least one deviation taken by the user from the generated optimal route, resulting in captured deviation data, and (6) executing, by the computer system, a set of logical operations analyzing the captured deviation data with respect to the variables of interest data to identify whether at least one change occurred among the variables of interest at the time of the at least one deviation. In an embodiment, the variables of interest data include real-time route action data describing real-time route actions taken by other users using routes similar to the generated optimal route, real-time weather data describing real-time weather along the generated optimal route, real-time environmental data describing real-time environmental conditions along the generated optimal route, real-time risk to worker productivity data describing risks to worker productivity in light of the generated optimal route, and real-time likelihood of maintenance problems data describing a likelihood of maintenance problems in light of the generated optimal route. In a specific embodiment, risks to worker productivity include at least one of health risks, political instability, and worker strikes. In an embodiment, the critical variable data include time data related to the user and location data related to the user, wherein the time data and the location data describe particular locations of the user with respect to the generated optimal route at particular times.

Definitions

Supply Chain

A supply chain is a system of organizations, people, activities, information, and resources involved in moving a product or service from supplier to customer. Supply chain activities involve the transformation of natural resources, raw materials, and components into a finished product that is delivered to the end customer. In sophisticated supply chain systems, used products may re-enter the supply chain at any point where residual value is recyclable. Supply chains link value chains. Various aspects of optimizing the supply chain include (a) liaising with suppliers to eliminate bottlenecks, (b) sourcing strategically to strike a balance between lowest material cost and transportation, (c) implementing just-in-time techniques to optimize manufacturing flow, (d) maintaining the right mix and location of factories and warehouses to serve customer markets, and (e) using location allocation, vehicle routing analysis, dynamic programming, and traditional logistics optimization to maximize the efficiency of distribution.

Supply Chain Optimization

Supply chain optimization is the application of processes and tools to ensure the optimal operation of a manufacturing and distribution supply chain, including the optimal placement of inventory within the supply chain and minimizing operating costs (including manufacturing costs, transportation costs, and distribution costs). Supply chain optimization often involves the application of mathematical modelling techniques using computer software. Supply chain optimization attempts to maximize the profitable operation of the manufacturing and distribution supply chain by measures such as maximizing gross margin return on inventory invested (GMROII) (balancing the cost of inventory at all points in the supply chain with availability to the customer), minimizing total operating expenses (transportation, inventory and manufacturing), or maximizing gross profit of products distributed through the supply chain. Supply chain optimization addresses the general supply chain problem of delivering products to customers at the lowest total cost and highest profit by trading off the costs of inventory, transportation, distributing and manufacturing. For example, optimizing storage and transportation costs by means of product/package size is one of the easiest and most cost effective initial implementations available to save money in product distribution.

Supply chain optimization attempts to forecast future inventory demand as accurately as possible, by applying statistical trending and "best fit" techniques based on historic demand and predicted future events. Supply chain optimization manages unpredictability in demand is then managed by setting safety stock levels. For example, a distributor may hold two weeks of supply of an article with steady demand but twice that amount for an article where the demand is more erratic. Then, using this forecast demand, supply chain optimization creates a supply chain manufacturing production panning and distribution plan to manufacture and distribute products to meet this forecast demand at lowest cost (or highest profitability), addressing (a) how much of each product should be manufactured each day, (b) how much of each product should be made at each manufacturing plant, (c) which manufacturing plants should restock which warehouses with which products, and (d) what transportation modes should be used for warehouse replenishment and customer deliveries.

Supply chain optimization calculates the most desirable inventory level per article for each individual store for their retail customers, trading off cost of inventory against expectation of sale, resulting in an optimized inventory level known as a model stock. Because the movement of product to meet the model stock, called the stock transfer, needs to be in economic shipping units such as complete unit loads or a full truckload, supply chain optimization makes a series of decisions, such as rounding the model stock quantity up to the nearest full shipping unit. For example, if supply chain optimization creates truckloads as economic shipment units, supply chain optimization must ensure that axle constraints and space constraints are met while loading can be achieved in a damage-free way, by continuing to add time-phased requirements until the loads meet some minimum weight or cube. Supply chain optimization may also take into account stackability constraints, load and unloading rules, palletizing logic, warehouse efficiency and load stability with an objective to reduce transportation spend (i.e., minimize "shipping air").

Supply chain optimization also factors in risks and unexpected constraints that often affect a global supply chain's efficiency, including sudden spikes in fuel costs, material shortages, natural disasters such as hurricanes, and instability of global politics.

Clustering

Clustering or cluster analysis is the task of grouping a set of objects in such a way that objects in the same group (called a cluster) are more similar (in some sense or another) to each other than to those in other groups (clusters). Clustering may be achieved by various algorithms that differ significantly in their notion of what constitutes a cluster and how to efficiently find them, where popular notions of clusters include groups with small distances among the cluster members, dense areas of the data space, intervals or particular statistical distributions. Clustering may be formulated as a multi-objective optimization problem such that the appropriate clustering algorithm and parameter settings (including values such as the distance function to use, a density threshold or the number of expected clusters) depend on the individual data set and intended use of the results. Clustering is an iterative process of knowledge discovery or interactive multi-objective optimization that involves trial and failure such that it is often necessary to modify data preprocessing and model parameters until the result achieves the desired properties.

Aggregating Data

Aggregating data may include arranged the data into hierarchical groups, often called dimensions, and into facts and aggregate facts. A fact may be a value or measurement, which represents a fact about a managed entity or system. Facts, as reported by a reporting entity, are said to be at raw level. Facts at the raw level are further aggregated to higher levels in various dimensions to extract more service or business-relevant information from it, resulting in aggregates or summaries or aggregated facts.

Affinity Analysis

Affinity analysis is a data analysis and data mining technique that discovers co-occurrence relationships among activities performed by (or recorded about) specific individuals or groups. Affinity analysis may be applied to any process where agents can be uniquely identified and information about their activities can be recorded. For example, in retail, affinity analysis is used to perform market basket analysis, in which retailers seek to understand the purchase behavior of customers, where such information could then be used for purposes of cross-selling and up-selling, in addition to influencing sales promotions, loyalty programs, store design, and discount plans.

Machine Learning

Machine learning is computer software/computer algorithm that can learn from and make predictions on data where such software overcomes following strictly static program instructions by making data-driven predictions or decisions, by through building a model from sample inputs. Machine learning software/algorithms devise complex models and algorithms that lend themselves to prediction, such as predictive analytics, where such analytical models allow researchers, data scientists, engineers, and analysts to produce reliable, repeatable decisions and results and uncover hidden insights through learning from historical relationships and trends in the data. Formally, a machine learning computer software/computer algorithm/computer program is said to learn from experience E with respect to some class of tasks T and performance measure P if its performance at tasks in T, as measured by P, improves with experience E.

Machine Learning Tasks

Machine learning tasks are typically classified into three broad categories, depending on the nature of the learning signal or feedback available to a machine learning software/algorithm/program. A first category is supervised learning, where the computer is presented with example inputs and their desired outputs, given by a teacher, with a goal of the computer learning a general rule that maps inputs to outputs. A second category is unsupervised learning where no labels are given to the machine learning algorithm, leaving it on its own to find structure in its input, with a goal of unsupervised learning (discovering hidden patterns in data) of feature learning. A third category is reinforcement learning where the machine learning computer program interacts with a dynamic environment in which it must perform a certain goal (such as driving a vehicle or playing a game against an opponent), where the machine learning program is provided feedback in terms of rewards and punishments as it navigates its problem space. A fourth category is semi-supervised learning, between supervised and unsupervised learning, where the teacher gives an incomplete training signal (i.e., a training set with some (often many) of the target outputs missing), where transduction is a special case of this principle where the entire set of problem instances is known at learning time, except that part of the targets are missing.

Machine learning tasks may also be categorized according to the desired output of the machine learning software/algorithm/program. For example, for machine learning with classification as the desired output, inputs are divided into two or more classes, and the learner/machine learning software must produce a model that assigns unseen inputs to one or more (multi-label classification) of these classes, where this is typically tackled in a supervised way (e.g., spam filtering, where the inputs are email (or other) messages and the classes are spam and not spam. As another example, for machine learning with regression as the desired output (a supervised problem), the outputs are continuous rather than discrete. In addition, for machine learning with clustering as the desired output, a set of inputs is to be divided into groups, where the groups are not known beforehand, making this typically an unsupervised task. Also, for machine learning with density estimation as the desired output, machine learning finds the distribution of inputs in some space. As another example, for machine learning with dimensionality reduction as the desired output, machine learning simplifies inputs by mapping them into a lower-dimensional space, where topic modeling is a related problem, where a program is given a list of human language documents and is tasked to find out which documents cover similar topics.

Machine Learning Approaches

Machine learning software/algorithms/programs operate via different approaches. For example, decision tree learning uses a decision tree as a predictive model, which maps observations about an item to conclusions about the item's target value. Also, association rule learning is a method for discovering interesting relations between variables in large databases. As another example, support vector machines (SVMs) are a set of related supervised learning methods used for classification and regression, where given a set of training examples, each marked as belonging to one of two categories, an SVM training algorithm builds a model that predicts whether a new example falls into one category or the other. Cluster analysis (unsupervised learning) is the assignment of a set of observations into subsets (called clusters) so that observations within the same cluster are similar according to some predesignated criterion or criteria, while observations drawn from different clusters are dissimilar, where different clustering techniques make different assumptions on the structure of the data, often defined by some similarity metric and evaluated for example by internal compactness (similarity between members of the same cluster) and separation between different clusters, with other methods being based on estimated density and graph connectivity.

Reinforcement learning is a machine learning approach which is concerned with how an agent ought to take actions in an environment so as to maximize some notion of long-term reward, attempting to find a policy that maps states of the world to the actions the agent ought to take in those states, where neither correct input/output pairs are presented nor sub-optimal actions are explicitly corrected. In similarity and metric learning, the machine learning software/algorithm/program is given pairs of examples that are considered similar and pairs of less similar objects and learns a similarity function (or a distance metric function) that can predict if new objects are similar.

Robot

A robot is a machine, especially one programmable by a computer, that is capable of carrying out a complex series of actions automatically, where the robot may be guided by an external control device or may be guided by an embedded control mechanism. Robots tend to possess some or all of the following abilities and functions: (a) accept electronic programming; (b) process data or physical perceptions electronically; (c) operate autonomously to some degree; (d) move around; (e) operate physical parts of itself or physical processes; (f) sense and manipulate their environment; and (g) exhibit intelligent behavior, especially behavior which mimics humans or other animals.

Cognitive Computing

Cognitive computing describes technology platforms that are based on the scientific disciplines of artificial intelligence and signal processing. Cognitive computing platforms encompass machine learning, reasoning, natural language processing, speech recognition and vision (object recognition), human-computer interaction, dialog and narrative generation. A cognitive computing platform may be hardware and/or software that mimics the functioning of the human brain and helps to improve human decision-making. A cognitive computing system may learn at scale, reason with purpose, and interact with humans naturally. Cognitive computing systems may express certain features. For example, cognitive computing systems may be adaptive, in that such systems may learn as information changes, and as goals and requirements evolve, may resolve ambiguity and tolerate unpredictability, and may be engineered to feed on dynamic data in real time, or near real time. Cognitive computing systems may be interactive in that they may interact easily with users so that those users can define their needs comfortably, and they may also interact with other processors, devices, and cloud services, as well as with people. Also, cognitive computing systems may be iterative and stateful such that they may aid in defining a problem by asking questions or finding additional source input if a problem statement is ambiguous or incomplete, and they may remember previous interactions in a process and return information that is suitable for the specific application at that point in time. Cognitive computing systems may be contextual in that they may understand, identify, and extract contextual elements such as meaning, syntax, time, location, appropriate domain, regulations, user's profile, process, task and goal, and may draw on multiple sources of information, including both structured and unstructured digital information, as well as sensory inputs (visual, gestural, auditory, or sensor-provided).

Artificial Intelligence

Artificial intelligence is intelligence exhibited by machines, rather than humans or other animals. Artificial intelligence is any device that perceives its environment and takes actions that maximize its chance of success at some goal, where such a machine mimics cognitive functions that humans associate with other human minds, such as learning and problem solving. Artificial intelligence may accomplish reasoning, knowledge, planning, learning, natural language processing (communication), perception and the ability to move and manipulate objects. Artificial intelligence may perform tasks by using statistical methods, computational intelligence, versions of search and mathematical optimization, logic, methods based on probability, and methods based on economics. An intelligent agent artificial intelligence is a system/computer software/computer program/algorithm that perceives its environment and takes actions which maximize its chances of success, such as programs that solve specific problems that use approaches such as symbolic and logical approaches and sub-symbolic neural networks. Agent architectures and cognitive architecture artificial intelligence consist of interacting intelligent agents in a multi-agent system that includes both symbolic and sub-symbolic components that provides a bridge between sub-symbolic artificial intelligence and reactive levels and traditional symbolic intelligence, where relaxed time constraints permit planning and world modelling.

Current Technologies

Current technology focuses on telling people/users what to do (e.g., take this route/path). Current technology helps to make transportation decisions based on cost and time to delivery by employing a high-level route optimizer that is run once to determine the estimated delivery date to facilitate the transportation decision. Also, current technology adds additional nodes (e.g., preferred route, number of stops) to process more variables for route optimization. Current technology also uses internet of things and sensors to plan and track deliver routes for vehicles. In addition, current technology uses real and historic traffic data to show how good/bad traffic is an area. Current technology also uses cloud services to facilitate large data set sharing and processing logistics platforms, improving improve velocity to real-time/near real-time as well as facilitating information sharing.

Problems with Current Technologies

In supply chain optimization, the models are static and generally use high level modifiers (e.g., it's winter so snow storms will always add three days to delivery time.) As a result, there is very little emphasis on contingency planning. For example, known weak areas with current supply chain optimization techniques include taking into consideration (a) energy shortages, (b) strikes, (c) natural disasters, (d) product recalls, and (e) acts of violence. Also, current technology uses standard information with seasonal adjustments and does not consider other factors such as real-time data inputs when performing supply chain optimization, such that current technology could run route optimization models months in advance of actual delivery (not real-time). In addition, current technology does not capture inherent human knowledge, such as when users/transport workers make decisions for no obvious reason that can be captured by model variables. Current technology does not capture non-typical behavior of users/transport operators.

Referring to FIG. 1A, in an exemplary embodiment, the present invention is configured to perform an operation 110 of receiving, by a computer system, supply chain optimization data describing a supply chain optimization problem, an operation 112 of receiving, by the computer system, variables of interest data describing variables of interest with respect to the supply chain optimization problem, an operation 114 of generating, by the computer system, an optimal route for a user based on the supply chain optimization data and the variables of interest data, resulting in a generated optimal route, an operation 116 of monitoring, by the computer system, route execution data describing execution of the generated optimal route by the user, resulting in monitored route execution data, an operation 118 of capturing, by the computer system, deviation data from the monitored route execution data, with respect to critical variable data, where the deviation data describes at least one deviation taken by the user from the generated optimal route, resulting in captured deviation data, and an operation 120 of executing, by the computer system, a set of logical operations analyzing the captured deviation data with respect to the variables of interest data to identify whether at least one change occurred among the variables of interest at the time of the at least one deviation.

In an embodiment, the present invention creates dynamic routing models that continually optimize based on real-time conditions and information, including leveraging information about manual adjustments made by other ships/users/transportation means traveling the same route. For example, the present invention could consider real-time data inputs. In an embodiment, the present invention (a) captures an initial optimized plan, (b) tracks actual user modification over the time period for the route, (c) monitors end results (e.g., did the user modifications end up with better or worse routes as defined per one of many possible metrics), (d) aggregates results across multiple users, and (e) updates real-time route recommendation based on the aggregated results.

For example, the present invention could, given a problem of interest, build an initial optimal route that takes into consideration all the variables of interest, and then could track and monitor the execution of the optimal route as planned. Next, the present invention could capture user deviations from the original route as a function of critical variables such as time and location, and, for captured deviations, could run analysis to identify whether the underlying variables changed or not to cause the deviations. If the underlying variables indeed changed, the present invention could rerun the original optimal route planning to validate consistency with deviations of the user. If there was no change in the underlying variables, the present invention could interpret such a phenomenon to mean the user decided to make a change for a non-obvious reason (mostly based on the experience of the user), could capture such non-obvious user changes, and could leverage the non-obvious user changes for improved route planning optimization. The present invention could also repeat this process across multiple users, clustering the users into groups based on several metrics that may impact their choices (e.g., gender, experience, personality), and could then aggregate results within a group of users as well as across all groups. Finally, the present invention could pass along suggested deviations to other users following the same route, or could these suggested deviations as part of route planning optimization to improve results.

In an embodiment, the present invention makes use of a bi-directional flow of information. In particular embodiment, the present invention looks at deviations from a planned route, analyzes the deviations for positive and negative impacts, and auto-adjusts the planning based on this near real-time information. For example, the present invention could capture unexpected human decision in learning a better route, such as when a user/transport operator makes decisions for no obvious reason that can be captured by the model variables. In a specific example, if two routes were comparable but one route would require the driver to sit in traffic while the other route would require the driver to make a local detour of an extra five miles, a difference in personality among drivers could may make one driver want to go the longer route if the driver could avoid traffic, where such detour could result in a better state of mind for the driver, perhaps resulting the driver being able to handle the remaining deliveries better (an example of unexpected human decisions and/or preferred human intuition). In a further example, the present invention could segment the human audience/user audience/transport operator audience to optimize per segment.

In an embodiment, the present invention captures and leverages preferred human intuition and non-typical user/transport operator behavior that is not directly modeled by optimal route planning. For example, if a driver of a truck knew that taking street A is more dangerous than taking street B when it is snowing because the driver had been through that area many times before, the present invention could capture and could leverage such behavior by learning from the behavior without trying to analyze the behavior. In another example, the present invention could capture and leverage local variations/changes on a full planned route. Specifically, for example, if mapping software were to suggest a preferred route for a user and the present invention were to find that the user (in a local span of the route) had chosen a different alternative, the present invention could interpret that there was a reason for such choice, could capture some indicator that the human driver relied on to decide to take a different local detour, could capture such behavior, and could update the suggested route based on such behavior. In an embodiment, the present invention makes use of variance analysis, at least in identifying deviations from planned routes.

Figure 4:
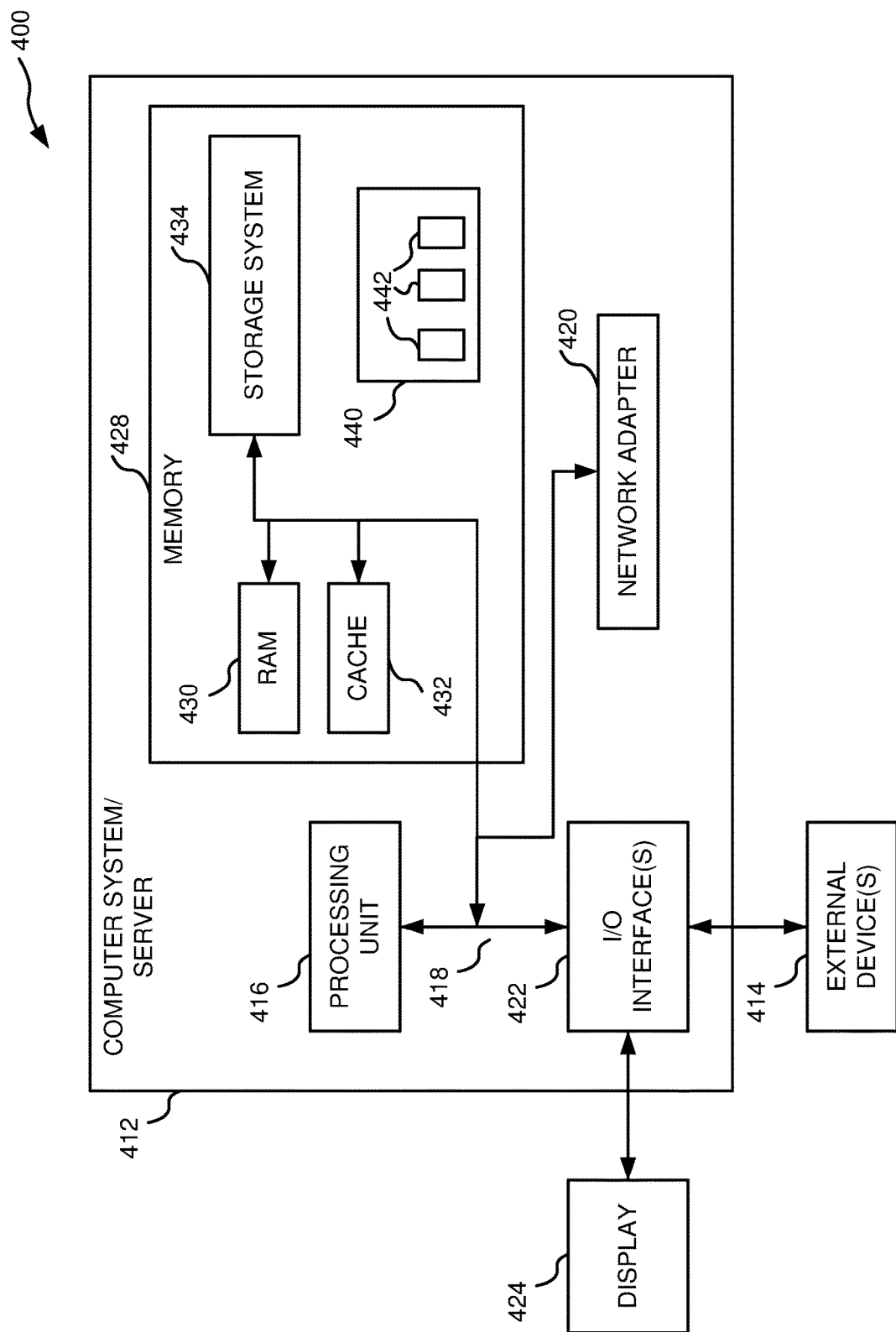
FIG. 4 depicts a computer system in accordance with an exemplary embodiment of the present invention.

In an exemplary embodiment, the computer system is a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an embodiment, the computer system is a computer system 400 as shown in FIG. 4, that executes a real-time cognitive supply chain optimization script or computer software application that carries out the operations of at least method 100. In an embodiment, the computer system is a computer system/server 412 as shown in FIG. 4, that executes a real-time cognitive supply chain optimization script or computer software application that carries out the operations of at least method 100. In an embodiment, the computer system is a processing unit 416 as shown in FIG. 4, that executes a real-time cognitive supply chain optimization script or computer software application that carries out the operations of at least method 100. In an embodiment, the computer system is a computer system 400 as shown in FIG. 4, that executes a real-time cognitive supply chain optimization script or computer software application that carries out at least operations 110, 112, 114, 116, 118, and 120. In an embodiment, the computer system is a computer system/server 412 as shown in FIG. 4, that executes a real-time cognitive supply chain optimization script or computer software application that carries out at least operations 110, 112, 114, 116, 118, and 120. In an embodiment, the computer system is a processing unit 416 as shown in FIG. 4, that executes a real-time cognitive supply chain optimization script or computer software application that carries out at least operations 110, 112, 114, 116, 118, and 120.

In an embodiment, the computer system is a machine learning computer software/program/algorithm that executes a real-time cognitive supply chain optimization script or computer software application that carries out the operations of at least method 100. In an embodiment, the computer system is a machine learning computer software/program/algorithm that executes a real-time cognitive supply chain optimization script or computer software application that carries out at least operations 110, 112, 114, 116, 118, and 120. In an embodiment, the computer system is a robot that executes a real-time cognitive supply chain optimization script or computer software application that carries out the operations of at least method 100. In an embodiment, the computer system is a robot that executes a real-time cognitive supply chain optimization script or computer software application that carries out at least operations 110, 112, 114, 116, 118, and 120. In an embodiment, the computer system is a cognitive computing platform that executes a real-time cognitive supply chain optimization script or computer software application that carries out the operations of at least method 100. In an embodiment, the computer system is a cognitive computing platform that executes a real-time cognitive supply chain optimization script or computer software application that carries out at least operations 110, 112, 114, 116, 118, and 120. In an embodiment, the computer system is an artificial intelligence that executes a real-time cognitive supply chain optimization script or computer software application that carries out the operations of at least method 100. In an embodiment, the computer system is an artificial intelligence that executes a real-time cognitive supply chain optimization script or computer software application that carries out at least operations 110, 112, 114, 116, 118, and 120.

Figure 1B:
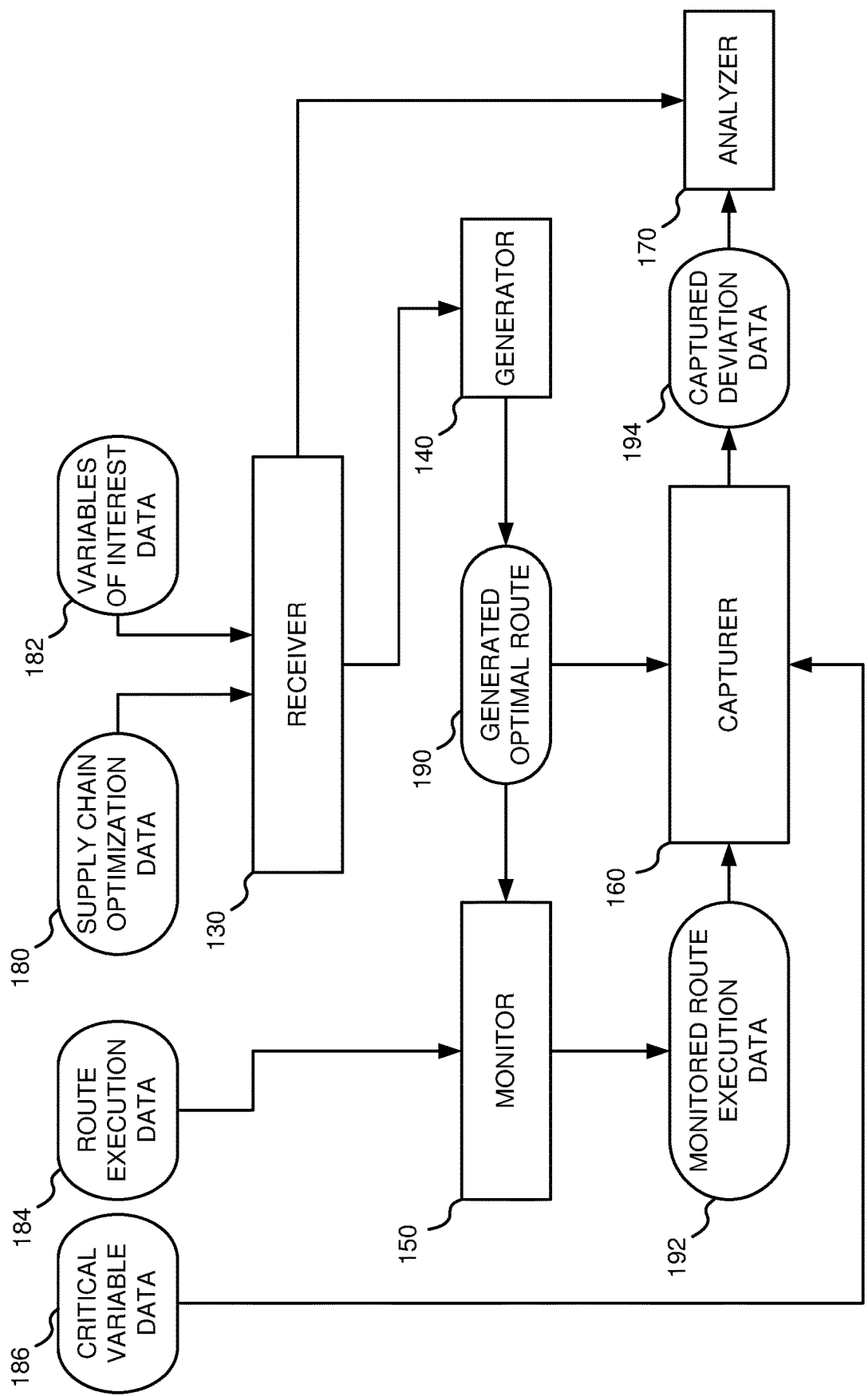
FIG. 1B depicts a block diagram in accordance with an exemplary embodiment of the present invention.

Referring to FIG. 1B, in an exemplary embodiment, the present invention includes a receiver 130, a generator 140, a monitor 150, a capturer 160, and an analyzer 170. In an embodiment, receiver 130 is configured to receive supply chain optimization data 180 describing a supply chain optimization problem. In an embodiment, receiver 130 includes a computer system, such as computer system 400 as shown in FIG. 4, performing operation 110. In an embodiment, receiver 130 includes a computer system, such as computer system/server 412 as shown in FIG. 4, performing operation 110. In an embodiment, receiver 130 includes a computer system, such as processing unit 416 as shown in FIG. 4, performing operation 110. In an embodiment, receiver 130 is implemented as computer software executing on a computer system, such as computer system 400 as shown in FIG. 4 such that the computer system performs operation 110. In an embodiment, receiver 130 is implemented as computer software executing on a computer system, such as computer system/server 412 as shown in FIG. 4, such that the computer system performs operation 110. In an embodiment, receiver 130 is implemented as computer software executing on a computer system, such as processing unit 416 as shown in FIG. 4 such that the computer system performs operation 110. In an embodiment, receiver 130 performs operation 110 as computer software executing on a processor of receiver 130. In an embodiment, receiver 130 includes a computer system, such as a machine learning computer software/program/algorithm performing operation 110. In an embodiment, receiver 130 includes a computer system, such as a robot performing operation 110. In an embodiment, receiver 130 includes a computer system, such as a cognitive computing platform performing operation 110. In an embodiment, receiver 130 includes a computer system, such as an artificial intelligence performing operation 110.

In an embodiment, receiver 130 is configured to receive variables of interest data 182 describing variables of interest with respect to the supply chain optimization problem. In an embodiment, receiver 130 includes a computer system, such as computer system 400 as shown in FIG. 4, performing operation 112. In an embodiment, receiver 130 includes a computer system, such as computer system/server 412 as shown in FIG. 4, performing operation 112. In an embodiment, receiver 130 includes a computer system, such as processing unit 416 as shown in FIG. 4, performing operation 112. In an embodiment, receiver 130 is implemented as computer software executing on a computer system, such as computer system 400 as shown in FIG. 4 such that the computer system performs operation 112. In an embodiment, receiver 130 is implemented as computer software executing on a computer system, such as computer system/server 412 as shown in FIG. 4, such that the computer system performs operation 112. In an embodiment, receiver 130 is implemented as computer software executing on a computer system, such as processing unit 416 as shown in FIG. 4 such that the computer system performs operation 112. In an embodiment, receiver 130 performs operation 112 as computer software executing on a processor of receiver 130. In an embodiment, receiver 130 includes a computer system, such as a machine learning computer software/program/algorithm performing operation 112. In an embodiment, receiver 130 includes a computer system, such as a robot performing operation 112. In an embodiment, receiver 130 includes a computer system, such as a cognitive computing platform performing operation 112. In an embodiment, receiver 130 includes a computer system, such as an artificial intelligence performing operation 112.

In an embodiment, generator 140 is configured to generate an optimal route for a user based on supply chain optimization data 180 and variables of interest data 182, resulting in a generated optimal route 190. In an embodiment, generator 140 includes a computer system, such as computer system 400 as shown in FIG. 4, performing operation 114. In an embodiment, generator 140 includes a computer system, such as computer system/server 412 as shown in FIG. 4, performing operation 114. In an embodiment, generator 140 includes a computer system, such as processing unit 416 as shown in FIG. 4, performing operation 114. In an embodiment, generator 140 is implemented as computer software executing on a computer system, such as computer system 400 as shown in FIG. 4 such that the computer system performs operation 114. In an embodiment, generator 140 is implemented as computer software executing on a computer system, such as computer system/server 412 as shown in FIG. 4, such that the computer system performs operation 114. In an embodiment, generator 140 is implemented as computer software executing on a computer system, such as processing unit 416 as shown in FIG. 4 such that the computer system performs operation 114. In an embodiment, generator 140 performs operation 114 as computer software executing on a processor of generator 140. In an embodiment, generator 140 includes a computer system, such as a machine learning computer software/program/algorithm performing operation 114. In an embodiment, generator 140 includes a computer system, such as a robot performing operation 114. In an embodiment, generator 140 includes a computer system, such as a cognitive computing platform performing operation 114. In an embodiment, generator 140 includes a computer system, such as an artificial intelligence performing operation 114.

In an embodiment, monitor 150 is configured to monitor route execution data 184 describing execution of generated optimal route 190 by the user, resulting in monitored route execution data 192. In an embodiment, monitor 150 includes a computer system, such as computer system 400 as shown in FIG. 4, performing operation 116. In an embodiment, monitor 150 includes a computer system, such as computer system/server 412 as shown in FIG. 4, performing operation 116. In an embodiment, monitor 150 includes a computer system, such as processing unit 416 as shown in FIG. 4, performing operation 116. In an embodiment, monitor 150 is implemented as computer software executing on a computer system, such as computer system 400 as shown in FIG. 4 such that the computer system performs operation 116. In an embodiment, monitor 150 is implemented as computer software executing on a computer system, such as computer system/server 412 as shown in FIG. 4, such that the computer system performs operation 116. In an embodiment, monitor 150 is implemented as computer software executing on a computer system, such as processing unit 416 as shown in FIG. 4 such that the computer system performs operation 116. In an embodiment, monitor 150 performs operation 116 as computer software executing on a processor of monitor 150. In an embodiment, monitor 150 includes a computer system, such as a machine learning computer software/program/algorithm performing operation 116. In an embodiment, monitor 150 includes a computer system, such as a robot performing operation 116. In an embodiment, monitor 150 includes a computer system, such as a cognitive computing platform performing operation 116. In an embodiment, monitor 150 includes a computer system, such as an artificial intelligence performing operation 116.

In an embodiment, capturer 160 is configured to capture deviation data from monitored route execution data 192, with respect to critical variable data 186, where the deviation data describes at least one deviation taken by the user from generated optimal route 190, resulting in captured deviation data 194. In an embodiment, capturer 160 includes a computer system, such as computer system 400 as shown in FIG. 4, performing operation 118. In an embodiment, capturer 160 includes a computer system, such as computer system/server 412 as shown in FIG. 4, performing operation 118. In an embodiment, capturer 160 includes a computer system, such as processing unit 416 as shown in FIG. 4, performing operation 118. In an embodiment, capturer 160 is implemented as computer software executing on a computer system, such as computer system 400 as shown in FIG. 4 such that the computer system performs operation 118. In an embodiment, capturer 160 is implemented as computer software executing on a computer system, such as computer system/server 412 as shown in FIG. 4, such that the computer system performs operation 118. In an embodiment, capturer 160 is implemented as computer software executing on a computer system, such as processing unit 416 as shown in FIG. 4 such that the computer system performs operation 118. In an embodiment, capturer 160 performs operation 118 as computer software executing on a processor of capturer 160. In an embodiment, capturer 160 includes a computer system, such as a machine learning computer software/program/algorithm performing operation 118. In an embodiment, capturer 160 includes a computer system, such as a robot performing operation 118. In an embodiment, capturer 160 includes a computer system, such as a cognitive computing platform performing operation 118. In an embodiment, capturer 160 includes a computer system, such as an artificial intelligence performing operation 118.

In an embodiment, analyzer 170 is configured to execute a set of logical operations analyzing captured deviation data 194 with respect to variables of interest data 182 to identify whether at least one change occurred among the variables of interest at the time of the at least one deviation. In an embodiment, analyzer 170 includes a computer system, such as computer system 400 as shown in FIG. 4, performing operation 120. In an embodiment, analyzer 170 includes a computer system, such as computer system/server 412 as shown in FIG. 4, performing operation 120. In an embodiment, analyzer 170 includes a computer system, such as processing unit 416 as shown in FIG. 4, performing operation 120. In an embodiment, analyzer 170 is implemented as computer software executing on a computer system, such as computer system 400 as shown in FIG. 4 such that the computer system performs operation 120. In an embodiment, analyzer 170 is implemented as computer software executing on a computer system, such as computer system/server 412 as shown in FIG. 4, such that the computer system performs operation 120. In an embodiment, analyzer 170 is implemented as computer software executing on a computer system, such as processing unit 416 as shown in FIG. 4 such that the computer system performs operation 120. In an embodiment, analyzer 170 performs operation 120 as computer software executing on a processor of analyzer 170. In an embodiment, analyzer 170 includes a computer system, such as a machine learning computer software/program/algorithm performing operation 120. In an embodiment, analyzer 170 includes a computer system, such as a robot performing operation 120. In an embodiment, analyzer 170 includes a computer system, such as a cognitive computing platform performing operation 120. In an embodiment, analyzer 170 includes a computer system, such as an artificial intelligence performing operation 120.

Revised Optimal Route

Figure 2A:
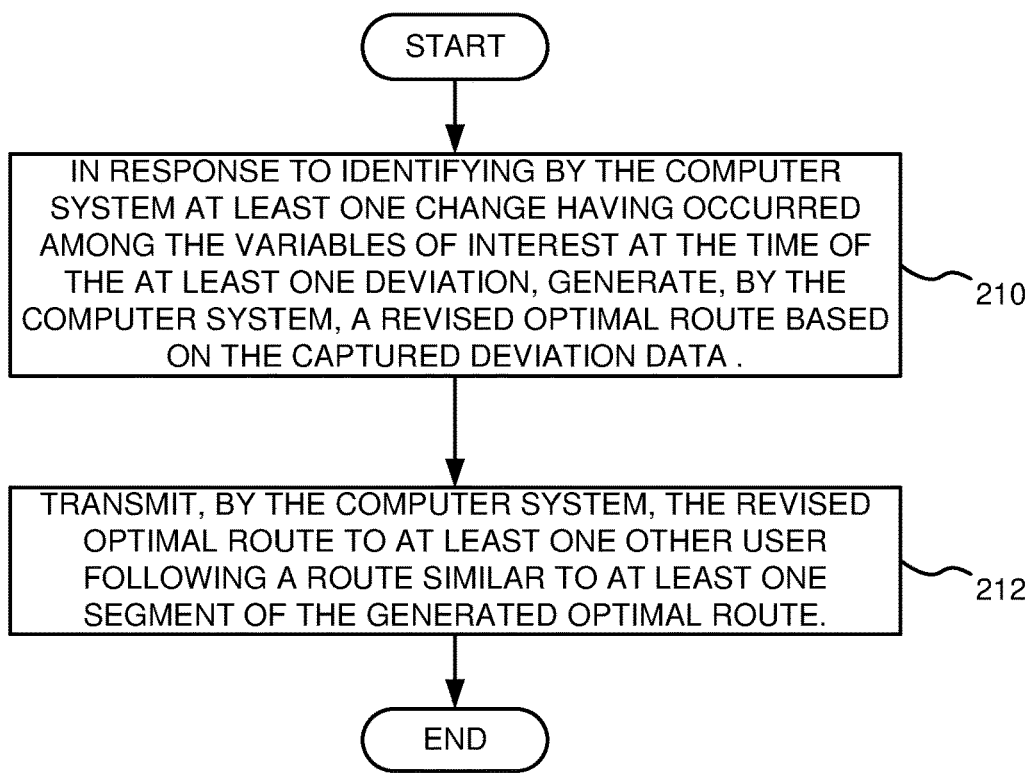
FIG. 2A depicts a flowchart in accordance with an embodiment of the present invention.

In a further embodiment, the computer implemented method, the system, and the computer program product further include (a) in response to identifying by the computer system at least one change having occurred among the variables of interest at the time of the at least one deviation, generating, by the computer system, a revised optimal route based on the captured deviation data, and (b) transmitting, by the computer system, the revised optimal route to at least one other user following a route similar to at least one segment of the generated optimal route. Referring to FIG. 2A, in a further embodiment, the present invention is further configured to perform an operation 210 of in response to identifying by the computer system at least one change having occurred among the variables of interest at the time of the at least one deviation, generating, by the computer system, a revised optimal route based on the captured deviation data, and an operation 212 of transmitting, by the computer system, the revised optimal route to at least one other user following a route similar to at least one segment of the generated optimal route.

In an embodiment, the computer system is a computer system 400 as shown in FIG. 4, that executes a real-time cognitive supply chain optimization script or computer software application that carries out the operations of at least method 200. In an embodiment, the computer system is a computer system/server 412 as shown in FIG. 4, that executes a real-time cognitive supply chain optimization script or computer software application that carries out the operations of at least method 200. In an embodiment, the computer system is a processing unit 416 as shown in FIG. 4, that executes a real-time cognitive supply chain optimization script or computer software application that carries out the operations of at least method 200. In an embodiment, the computer system is a computer system 400 as shown in FIG. 4, that executes a real-time cognitive supply chain optimization script or computer software application that carries out at least operations 210 and 212. In an embodiment, the computer system is a computer system/server 412 as shown in FIG. 4, that executes a real-time cognitive supply chain optimization script or computer software application that carries out at least operations 210 and 212. In an embodiment, the computer system is a processing unit 416 as shown in FIG. 4, that executes a real-time cognitive supply chain optimization script or computer software application that carries out at least operations 210 and 212.

In an embodiment, the computer system is a machine learning computer software/program/algorithm that executes a real-time cognitive supply chain optimization script or computer software application that carries out the operations of at least method 200. In an embodiment, the computer system is a machine learning computer software/program/algorithm that executes a real-time cognitive supply chain optimization script or computer software application that carries out at least operations 210 and 212. In an embodiment, the computer system is a robot that executes a real-time cognitive supply chain optimization script or computer software application that carries out the operations of at least method 200. In an embodiment, the computer system is a robot that executes a real-time cognitive supply chain optimization script or computer software application that carries out at least operations 210 and 212. In an embodiment, the computer system is a cognitive computing platform that executes a real-time cognitive supply chain optimization script or computer software application that carries out the operations of at least method 200. In an embodiment, the computer system is a cognitive computing platform that executes a real-time cognitive supply chain optimization script or computer software application that carries out at least operations 210 and 212. In an embodiment, the computer system is an artificial intelligence that executes a real-time cognitive supply chain optimization script or computer software application that carries out the operations of at least method 200. In an embodiment, the computer system is an artificial intelligence that executes a real-time cognitive supply chain optimization script or computer software application that carries out at least operations 210 and 212.

Figure 2B:
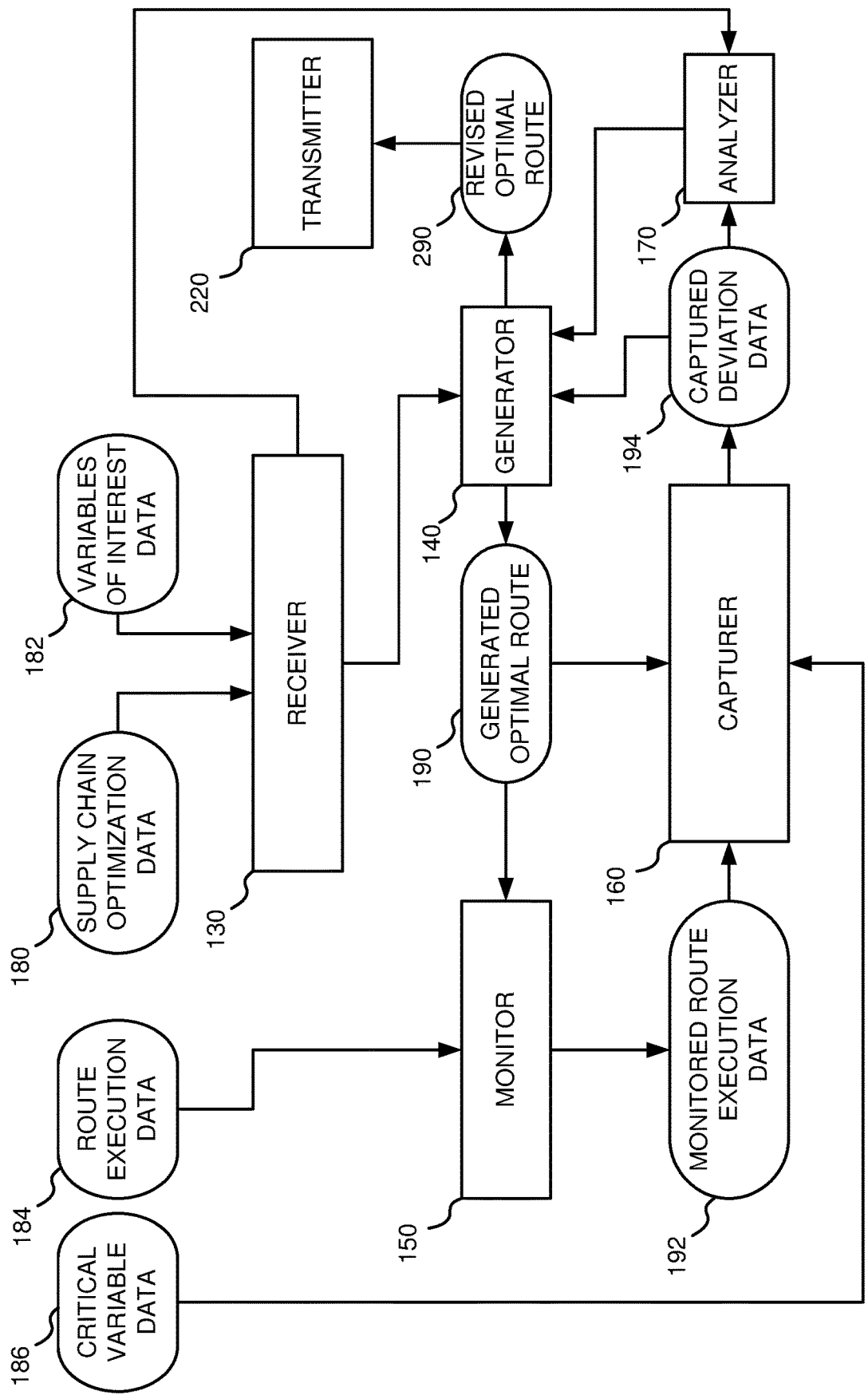
FIG. 2B depicts a block diagram in accordance with an embodiment of the present invention.

Referring to FIG. 2B, in a further embodiment, the present invention further includes a transmitter 220. In an embodiment, generator 140 is configured to generate, in response to analyzer 170 identifying at least one change having occurred among the variables of interest at the time of the at least one deviation, a revised optimal route 290 based on captured deviation data 194. In an embodiment, generator 140 includes a computer system, such as computer system 400 as shown in FIG. 4, performing operation 210. In an embodiment, generator 140 includes a computer system, such as computer system/server 412 as shown in FIG. 4, performing operation 210. In an embodiment, generator 140 includes a computer system, such as processing unit 416 as shown in FIG. 4, performing operation 210. In an embodiment, generator 140 is implemented as computer software executing on a computer system, such as computer system 400 as shown in FIG. 4 such that the computer system performs operation 210. In an embodiment, generator 140 is implemented as computer software executing on a computer system, such as computer system/server 412 as shown in FIG. 4, such that the computer system performs operation 210. In an embodiment, generator 140 is implemented as computer software executing on a computer system, such as processing unit 416 as shown in FIG. 4 such that the computer system performs operation 210. In an embodiment, generator 140 performs operation 210 as computer software executing on a processor of generator 140. In an embodiment, generator 140 includes a computer system, such as a machine learning computer software/program/algorithm performing operation 210. In an embodiment, generator 140 includes a computer system, such as a robot performing operation 210. In an embodiment, generator 140 includes a computer system, such as a cognitive computing platform performing operation 210. In an embodiment, generator 140 includes a computer system, such as an artificial intelligence performing operation 210.

In an embodiment, transmitter 220 is configured to transmit revised optimal route 196 to at least one other user following a route similar to at least one segment of generated optimal route 190. In an embodiment, transmitter 220 includes a computer system, such as computer system 400 as shown in FIG. 4, performing operation 212. In an embodiment, transmitter 220 includes a computer system, such as computer system/server 412 as shown in FIG. 4, performing operation 212. In an embodiment, transmitter 220 includes a computer system, such as processing unit 416 as shown in FIG. 4, performing operation 212. In an embodiment, transmitter 220 is implemented as computer software executing on a computer system, such as computer system 400 as shown in FIG. 4 such that the computer system performs operation 212. In an embodiment, transmitter 220 is implemented as computer software executing on a computer system, such as computer system/server 412 as shown in FIG. 4, such that the computer system performs operation 212. In an embodiment, transmitter 220 is implemented as computer software executing on a computer system, such as processing unit 416 as shown in FIG. 4 such that the computer system performs operation 212. In an embodiment, transmitter 220 performs operation 212 as computer software executing on a processor of transmitter 220. In an embodiment, transmitter 220 includes a computer system, such as a machine learning computer software/program/algorithm performing operation 212. In an embodiment, transmitter 220 includes a computer system, such as a robot performing operation 212. In an embodiment, transmitter 220 includes a computer system, such as a cognitive computing platform performing operation 212. In an embodiment, transmitter 220 includes a computer system, such as an artificial intelligence performing operation 212.

Alternate Route

Figure 3A:
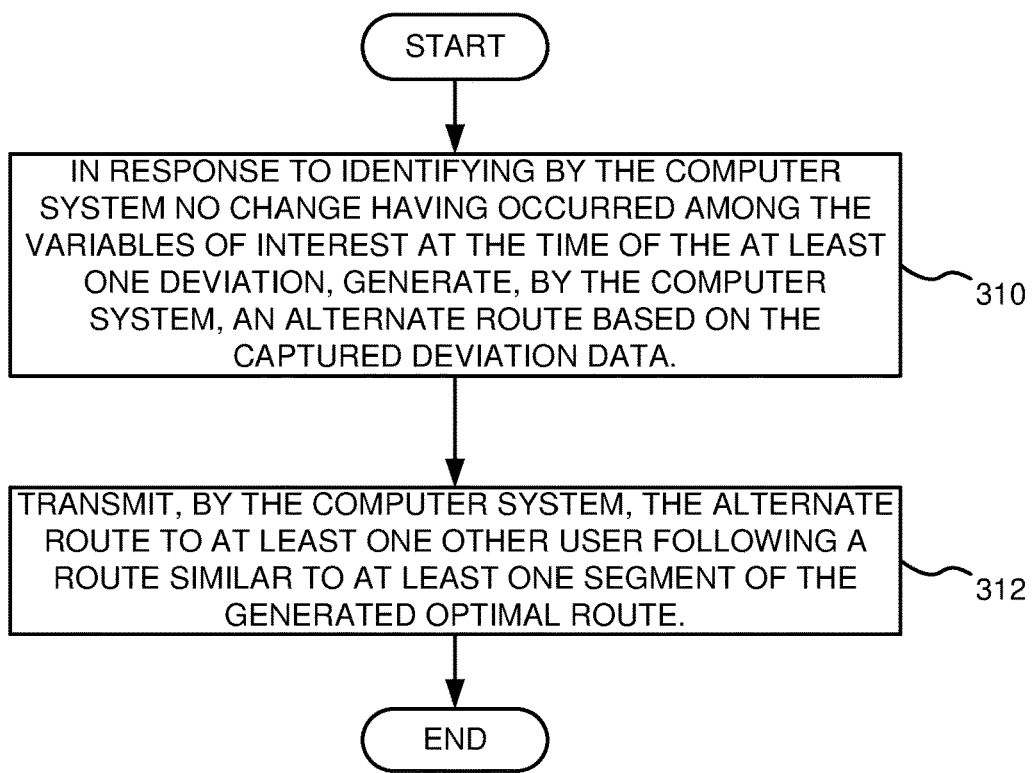
FIG. 3A depicts a flowchart in accordance with an embodiment of the present invention.

In a further embodiment, the computer implemented method, the system, and the computer program product further include (a) in response to identifying by the computer system no change having occurred among the variables of interest at the time of the at least one deviation, generating, by the computer system, an alternate route based on the captured deviation data, and (b) transmitting, by the computer system, the alternate route to at least one other user following a route similar to at least one segment of the generated optimal route. Referring to FIG. 3A, in a further embodiment, the present invention is further configured to perform an operation 310 of in response to identifying by the computer system no change having occurred among the variables of interest at the time of the at least one deviation, generating, by the computer system, an alternate route based on the captured deviation data, and an operation 312 of transmitting, by the computer system, the alternate route to at least one other user following a route similar to at least one segment of the generated optimal route.

In an embodiment, the computer system is a computer system 400 as shown in FIG. 4, that executes a real-time cognitive supply chain optimization script or computer software application that carries out the operations of at least method 300. In an embodiment, the computer system is a computer system/server 412 as shown in FIG. 4, that executes a real-time cognitive supply chain optimization script or computer software application that carries out the operations of at least method 300. In an embodiment, the computer system is a processing unit 416 as shown in FIG. 4, that executes a real-time cognitive supply chain optimization script or computer software application that carries out the operations of at least method 300. In an embodiment, the computer system is a computer system 400 as shown in FIG. 4, that executes a real-time cognitive supply chain optimization script or computer software application that carries out at least operations 310 and 312. In an embodiment, the computer system is a computer system/server 412 as shown in FIG. 4, that executes a real-time cognitive supply chain optimization script or computer software application that carries out at least operations 310 and 312. In an embodiment, the computer system is a processing unit 416 as shown in FIG. 4, that executes a real-time cognitive supply chain optimization script or computer software application that carries out at least operations 310 and 312.

In an embodiment, the computer system is a machine learning computer software/program/algorithm that executes a real-time cognitive supply chain optimization script or computer software application that carries out the operations of at least method 300. In an embodiment, the computer system is a machine learning computer software/program/algorithm that executes a real-time cognitive supply chain optimization script or computer software application that carries out at least operations 310 and 312. In an embodiment, the computer system is a robot that executes a real-time cognitive supply chain optimization script or computer software application that carries out the operations of at least method 300. In an embodiment, the computer system is a robot that executes a real-time cognitive supply chain optimization script or computer software application that carries out at least operations 310 and 312. In an embodiment, the computer system is a cognitive computing platform that executes a real-time cognitive supply chain optimization script or computer software application that carries out the operations of at least method 300. In an embodiment, the computer system is a cognitive computing platform that executes a real-time cognitive supply chain optimization script or computer software application that carries out at least operations 310 and 312. In an embodiment, the computer system is an artificial intelligence that executes a real-time cognitive supply chain optimization script or computer software application that carries out the operations of at least method 300. In an embodiment, the computer system is an artificial intelligence that executes a real-time cognitive supply chain optimization script or computer software application that carries out at least operations 310 and 312.

Figure 3B:
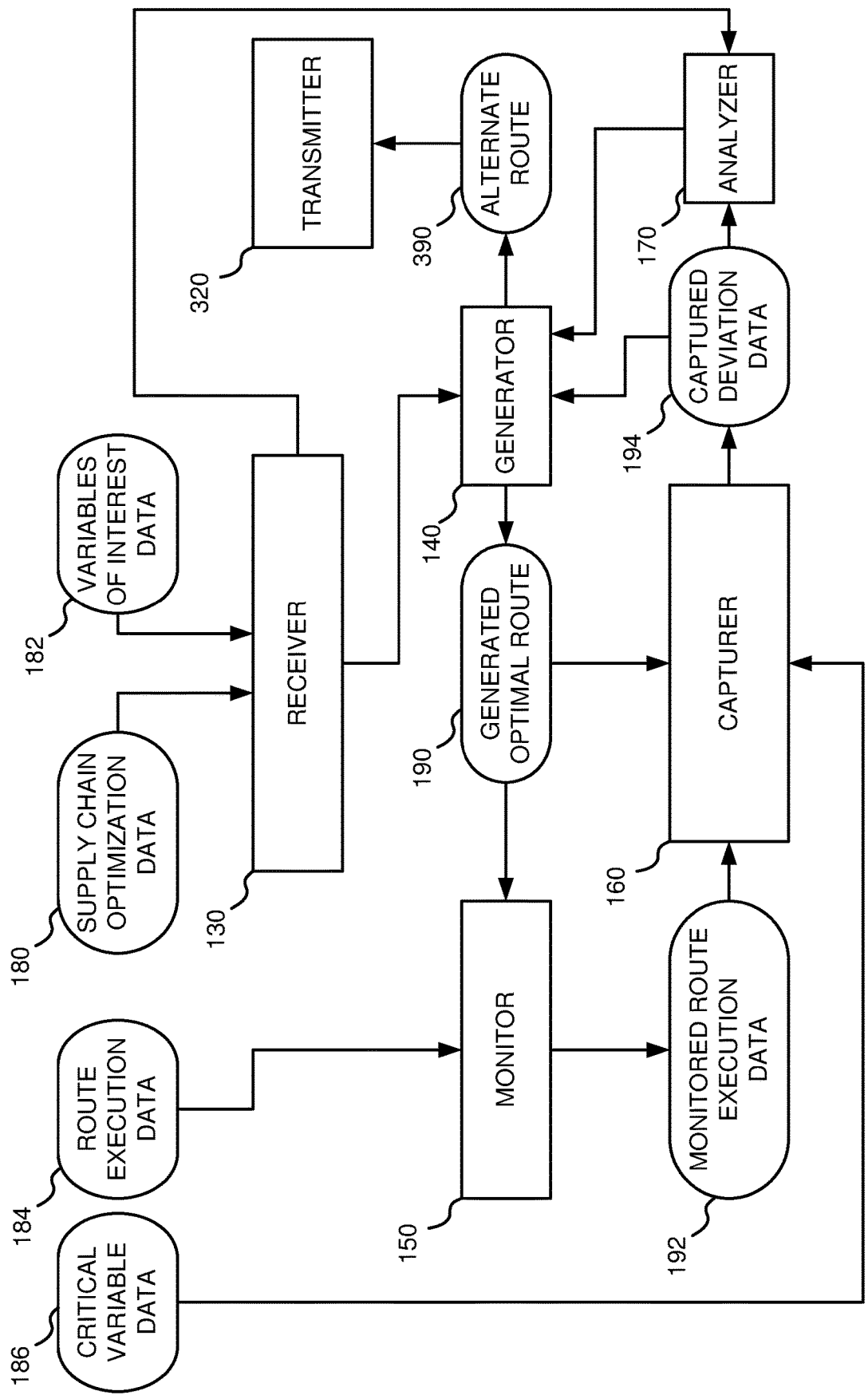
FIG. 3B depicts a block diagram in accordance with an embodiment of the present invention.

Referring to FIG. 3B, in a further embodiment, the present invention further includes a transmitter 320. In an embodiment, generator 140 is configured to generate, in response to analyzer 170 identifying no change having occurred among the variables of interest at the time of the at least one deviation, an alternate route 390 based on captured deviation data 194. In an embodiment, generator 140 includes a computer system, such as computer system 400 as shown in FIG. 4, performing operation 310. In an embodiment, generator 140 includes a computer system, such as computer system/server 412 as shown in FIG. 4, performing operation 310. In an embodiment, generator 140 includes a computer system, such as processing unit 416 as shown in FIG. 4, performing operation 310. In an embodiment, generator 140 is implemented as computer software executing on a computer system, such as computer system 400 as shown in FIG. 4 such that the computer system performs operation 310. In an embodiment, generator 140 is implemented as computer software executing on a computer system, such as computer system/server 412 as shown in FIG. 4, such that the computer system performs operation 310. In an embodiment, generator 140 is implemented as computer software executing on a computer system, such as processing unit 416 as shown in FIG. 4 such that the computer system performs operation 310. In an embodiment, generator 140 performs operation 310 as computer software executing on a processor of generator 140. In an embodiment, generator 140 includes a computer system, such as a machine learning computer software/program/algorithm performing operation 310. In an embodiment, generator 140 includes a computer system, such as a robot performing operation 310. In an embodiment, generator 140 includes a computer system, such as a cognitive computing platform performing operation 310. In an embodiment, generator 140 includes a computer system, such as an artificial intelligence performing operation 310.

In an embodiment, transmitter 320 is configured to transmit alternate route 198 to at least one other user following a route similar to at least one segment of generated optimal route 190. In an embodiment, transmitter 320 includes a computer system, such as computer system 400 as shown in FIG. 4, performing operation 312. In an embodiment, transmitter 320 includes a computer system, such as computer system/server 412 as shown in FIG. 4, performing operation 312. In an embodiment, transmitter 320 includes a computer system, such as processing unit 416 as shown in FIG. 4, performing operation 312. In an embodiment, transmitter 320 is implemented as computer software executing on a computer system, such as computer system 400 as shown in FIG. 4 such that the computer system performs operation 312. In an embodiment, transmitter 320 is implemented as computer software executing on a computer system, such as computer system/server 412 as shown in FIG. 4, such that the computer system performs operation 312. In an embodiment, transmitter 320 is implemented as computer software executing on a computer system, such as processing unit 416 as shown in FIG. 4 such that the computer system performs operation 312. In an embodiment, transmitter 320 performs operation 312 as computer software executing on a processor of transmitter 320. In an embodiment, transmitter 320 includes a computer system, such as a machine learning computer software/program/algorithm performing operation 312. In an embodiment, transmitter 320 includes a computer system, such as a robot performing operation 312. In an embodiment, transmitter 320 includes a computer system, such as a cognitive computing platform performing operation 312. In an embodiment, transmitter 320 includes a computer system, such as an artificial intelligence performing operation 312.

Plurality of Other Users

In a further embodiment, the computer implemented method, the system, and the computer program product further include performing, by the computer system, for a plurality of other users, the receiving, the generating, the monitoring, the capturing, the executing, and the transmitting, resulting in monitored route execution data of the plurality of other users and captured deviation data of the plurality of other users. In an embodiment, the computer system is configured to perform receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system includes a computer system, such as computer system 400 as shown in FIG. 4, performing receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system includes a computer system, such as computer system/server 412 as shown in FIG. 4, performing receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system includes a computer system, such as processing unit 416 as shown in FIG. 4, performing receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users.

In an embodiment, the computer system is implemented as computer software executing on a computer system, such as computer system 400 as shown in FIG. 4, such that the computer system performs receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system is implemented as computer software executing on a computer system, such as computer system/server 412 as shown in FIG. 4, such that the computer system performs receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system is implemented as computer software executing on a computer system, such as processing unit 416 as shown in FIG. 4, such that the computer system performs receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system performs receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users as computer software executing on a processor of the computer system.

In an embodiment, the computer system is a machine learning computer software/program/algorithm performing receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system is a robot performing receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system is a cognitive computing platform performing receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users. In an embodiment, the computer system is an artificial intelligence performing receiving operation 110, receiving operation 112, generating operation 114, monitoring operation 116, capturing operation 118, executing operation 120, generating operation 310, and transmitting operation 312, for a plurality of other users, resulting in monitored route execution data of the plurality of other users and captured deviation data of the plurality of other users.

Groups of Users

In a particular embodiment, the performing includes executing, by the computer system, a set of logical operations clustering the user and the plurality of other users into groups of users based on metrics describing the user and the plurality of other users. In an embodiment, the metrics include gender of the user and the plurality of other users, experience of the user and the plurality of other users, and personalities of the user and the plurality of other users In an embodiment, the computer system is configured to execute a set of logical operations clustering the user and the plurality of other users into groups of users based on metrics describing the user and the plurality of other users. In an embodiment, the computer system includes a computer system, such as computer system 400 as shown in FIG. 4, executing a set of logical operations clustering the user and the plurality of other users into groups of users based on metrics describing the user and the plurality of other users. In an embodiment, the computer system includes a computer system, such as computer system/server 412 as shown in FIG. 4, executing a set of logical operations clustering the user and the plurality of other users into groups of users based on metrics describing the user and the plurality of other users. In an embodiment, the computer system includes a computer system, such as processing unit 416 as shown in FIG. 4, executing a set of logical operations clustering the user and the plurality of other users into groups of users based on metrics describing the user and the plurality of other users.

In an embodiment, the computer system is implemented as computer software executing on a computer system, such as computer system 400 as shown in FIG. 4, such that the computer system executes a set of logical operations clustering the user and the plurality of other users into groups of users based on metrics describing the user and the plurality of other users. In an embodiment, the computer system is implemented as computer software executing on a computer system, such as computer system/server 412 as shown in FIG. 4, such that the computer system executes a set of logical operations clustering the user and the plurality of other users into groups of users based on metrics describing the user and the plurality of other users. In an embodiment, the computer system is implemented as computer software executing on a computer system, such as processing unit 416 as shown in FIG. 4, such that the computer system executes a set of logical operations clustering the user and the plurality of other users into groups of users based on metrics describing the user and the plurality of other users. In an embodiment, the computer system executes a set of logical operations clustering the user and the plurality of other users into groups of users based on metrics describing the user and the plurality of other users as computer software executing on a processor of the computer system.

In an embodiment, the computer system is a machine learning computer software/program/algorithm clustering the user and the plurality of other users into groups of users based on metrics describing the user and the plurality of other users. In an embodiment, the computer system is a robot clustering the user and the plurality of other users into groups of users based on metrics describing the user and the plurality of other users. In an embodiment, the computer system is a cognitive computing platform clustering the user and the plurality of other users into groups of users based on metrics describing the user and the plurality of other users. In an embodiment, the computer system is an artificial intelligence clustering the user and the plurality of other users into groups of users based on metrics describing the user and the plurality of other users.

Aggregating Data within Groups of Users

In a further embodiment, the performing further includes executing, by the computer system, a set of logical operations aggregating the captured deviation data within the groups of users, resulting in aggregated deviation data. In an embodiment, the computer system is configured to execute a set of logical operations aggregating the captured deviation data within the groups of users, resulting in aggregated deviation data. In an embodiment, the computer system includes a computer system, such as computer system 400 as shown in FIG. 4, executing a set of logical operations aggregating the captured deviation data within the groups of users, resulting in aggregated deviation data. In an embodiment, the computer system includes a computer system, such as computer system/server 412 as shown in FIG. 4, executing a set of logical operations aggregating the captured deviation data within the groups of users, resulting in aggregated deviation data. In an embodiment, the computer system includes a computer system, such as processing unit 416 as shown in FIG. 4, executing a set of logical operations aggregating the captured deviation data within the groups of users, resulting in aggregated deviation data.

In an embodiment, the computer system is implemented as computer software executing on a computer system, such as computer system 400 as shown in FIG. 4, such that the computer system executes a set of logical operations aggregating the captured deviation data within the groups of users, resulting in aggregated deviation data. In an embodiment, the computer system is implemented as computer software executing on a computer system, such as computer system/server 412 as shown in FIG. 4, such that the computer system executes a set of logical operations aggregating the captured deviation data within the groups of users, resulting in aggregated deviation data. In an embodiment, the computer system is implemented as computer software executing on a computer system, such as processing unit 416 as shown in FIG. 4, such that the computer system executes a set of logical operations aggregating the captured deviation data within the groups of users, resulting in aggregated deviation data. In an embodiment, the computer system executes a set of logical operations aggregating the captured deviation data within the groups of users, resulting in aggregated deviation data as computer software executing on a processor of the computer system.

In an embodiment, the computer system is a machine learning computer software/program/algorithm aggregating the captured deviation data within the groups of users, resulting in aggregated deviation data. In an embodiment, the computer system is a robot aggregating the captured deviation data within the groups of users, resulting in aggregated deviation data. In an embodiment, the computer system is a cognitive computing platform aggregating the captured deviation data within the groups of users, resulting in aggregated deviation data. In an embodiment, the computer system is an artificial intelligence aggregating the captured deviation data within the groups of users, resulting in aggregated deviation data.

In a further embodiment, the executing further includes transmitting, by the computer system, the aggregated deviation data to at least one other user following a route similar to at least one segment of the generated optimal route. In an embodiment, the computer system is configured to transmit the aggregated deviation data to at least one other user following a route similar to at least one segment of the generated optimal route. In an embodiment, the computer system includes a computer system, such as computer system 400 as shown in FIG. 4, transmitting the aggregated deviation data to at least one other user following a route similar to at least one segment of the generated optimal route. In an embodiment, the computer system includes a computer system, such as computer system/server 412 as shown in FIG. 4, transmitting the aggregated deviation data to at least one other user following a route similar to at least one segment of the generated optimal route. In an embodiment, the computer system includes a computer system, such as processing unit 416 as shown in FIG. 4, transmitting the aggregated deviation data to at least one other user following a route similar to at least one segment of the generated optimal route.

In an embodiment, the computer system is implemented as computer software executing on a computer system, such as computer system 400 as shown in FIG. 4, such that the computer system transmits the aggregated deviation data to at least one other user following a route similar to at least one segment of the generated optimal route. In an embodiment, the computer system is implemented as computer software executing on a computer system, such as computer system/server 412 as shown in FIG. 4, such that the computer system transmits the aggregated deviation data to at least one other user following a route similar to at least one segment of the generated optimal route. In an embodiment, the computer system is implemented as computer software executing on a computer system, such as processing unit 416 as shown in FIG. 4, such that the computer system transmits the aggregated deviation data to at least one other user following a route similar to at least one segment of the generated optimal route. In an embodiment, the computer system transmits the aggregated deviation data to at least one other user following a route similar to at least one segment of the generated optimal route as computer software executing on a processor of the computer system.

In an embodiment, the computer system is a machine learning computer software/program/algorithm transmitting the aggregated deviation data to at least one other user following a route similar to at least one segment of the generated optimal route. In an embodiment, the computer system is a robot transmitting the aggregated deviation data to at least one other user following a route similar to at least one segment of the generated optimal route. In an embodiment, the computer system is a cognitive computing platform transmitting the aggregated deviation data to at least one other user following a route similar to at least one segment of the generated optimal route. In an embodiment, the computer system is an artificial intelligence transmitting the aggregated deviation data to at least one other user following a route similar to at least one segment of the generated optimal route.

In a particular embodiment, the transmitting the aggregated deviation data includes transmitting the aggregated deviation data to the at least one other user according to an affinity of the at least one other user with the groups of users. In an embodiment, the computer system is configured to transmit the aggregated deviation data to the at least one other user according to an affinity of the at least one other user with the groups of users. In an embodiment, the computer system includes a computer system, such as computer system 400 as shown in FIG. 4, transmitting the aggregated deviation data to the at least one other user according to an affinity of the at least one other user with the groups of users. In an embodiment, the computer system includes a computer system, such as computer system/server 412 as shown in FIG. 4, transmitting the aggregated deviation data to the at least one other user according to an affinity of the at least one other user with the groups of users. In an embodiment, the computer system includes a computer system, such as processing unit 416 as shown in FIG. 4, transmitting the aggregated deviation data to the at least one other user according to an affinity of the at least one other user with the groups of users.

In an embodiment, the computer system is implemented as computer software executing on a computer system, such as computer system 400 as shown in FIG. 4, such that the computer system transmits the aggregated deviation data to the at least one other user according to an affinity of the at least one other user with the groups of users. In an embodiment, the computer system is implemented as computer software executing on a computer system, such as computer system/server 412 as shown in FIG. 4, such that the computer system transmits the aggregated deviation data to the at least one other user according to an affinity of the at least one other user with the groups of users. In an embodiment, the computer system is implemented as computer software executing on a computer system, such as processing unit 416 as shown in FIG. 4, such that the computer system transmits the aggregated deviation data to the at least one other user according to an affinity of the at least one other user with the groups of users. In an embodiment, the computer system transmits the aggregated deviation data to the at least one other user according to an affinity of the at least one other user with the groups of users as computer software executing on a processor of the computer system.

In an embodiment, the computer system is a machine learning computer software/program/algorithm transmitting the aggregated deviation data to the at least one other user according to an affinity of the at least one other user with the groups of users. In an embodiment, the computer system is a robot transmitting the aggregated deviation data to the at least one other user according to an affinity of the at least one other user with the groups of users. In an embodiment, the computer system is a cognitive computing platform transmitting the aggregated deviation data to the at least one other user according to an affinity of the at least one other user with the groups of users. In an embodiment, the computer system is an artificial intelligence transmitting the aggregated deviation data to the at least one other user according to an affinity of the at least one other user with the groups of users.

In a further embodiment, the executing further includes adding, by the computer system, the aggregated deviation data to the supply chain optimization data. In an embodiment, the computer system is configured to add the aggregated deviation data to the supply chain optimization data. In an embodiment, the computer system includes a computer system, such as computer system 400 as shown in FIG. 4, adding the aggregated deviation data to the supply chain optimization data. In an embodiment, the computer system includes a computer system, such as computer system/server 412 as shown in FIG. 4, adding the aggregated deviation data to the supply chain optimization data. In an embodiment, the computer system includes a computer system, such as processing unit 416 as shown in FIG. 4, adding the aggregated deviation data to the supply chain optimization data.

In an embodiment, the computer system is implemented as computer software executing on a computer system, such as computer system 400 as shown in FIG. 4, such that the computer system adds the aggregated deviation data to the supply chain optimization data. In an embodiment, the computer system is implemented as computer software executing on a computer system, such as computer system/server 412 as shown in FIG. 4, such that the computer system adds the aggregated deviation data to the supply chain optimization data. In an embodiment, the computer system is implemented as computer software executing on a computer system, such as processing unit 416 as shown in FIG. 4, such that the computer system adds the aggregated deviation data to the supply chain optimization data. In an embodiment, the computer system adds the aggregated deviation data to the supply chain optimization data as computer software executing on a processor of the computer system.

In an embodiment, the computer system is a machine learning computer software/program/algorithm adding the aggregated deviation data to the supply chain optimization data. In an embodiment, the computer system is a robot adding the aggregated deviation data to the supply chain optimization data. In an embodiment, the computer system is a cognitive computing platform adding the aggregated deviation data to the supply chain optimization data. In an embodiment, the computer system is an artificial intelligence adding the aggregated deviation data to the supply chain optimization data.

Aggregating Data Across Groups of Users

In a further embodiment, the performing further includes executing, by the computer system, a set of logical operations aggregating the captured deviation data across the groups of users, resulting in aggregated deviation data. In an embodiment, the computer system is configured to execute a set of logical operations aggregating the captured deviation data across the groups of users, resulting in aggregated deviation data. In an embodiment, the computer system includes a computer system, such as computer system 400 as shown in FIG. 4, executing a set of logical operations aggregating the captured deviation data across the groups of users, resulting in aggregated deviation data. In an embodiment, the computer system includes a computer system, such as computer system/server 412 as shown in FIG. 4, executing a set of logical operations aggregating the captured deviation data across the groups of users, resulting in aggregated deviation data. In an embodiment, the computer system includes a computer system, such as processing unit 416 as shown in FIG. 4, executing a set of logical operations aggregating the captured deviation data across the groups of users, resulting in aggregated deviation data.

In an embodiment, the computer system is implemented as computer software executing on a computer system, such as computer system 400 as shown in FIG. 4, such that the computer system executes a set of logical operations aggregating the captured deviation data across the groups of users, resulting in aggregated deviation data. In an embodiment, the computer system is implemented as computer software executing on a computer system, such as computer system/server 412 as shown in FIG. 4, such that the computer system executes a set of logical operations aggregating the captured deviation data across the groups of users, resulting in aggregated deviation data. In an embodiment, the computer system is implemented as computer software executing on a computer system, such as processing unit 416 as shown in FIG. 4, such that the computer system executes a set of logical operations aggregating the captured deviation data across the groups of users, resulting in aggregated deviation data. In an embodiment, the computer system executes a set of logical operations aggregating the captured deviation data across the groups of users, resulting in aggregated deviation data as computer software executing on a processor of the computer system.

In an embodiment, the computer system is a machine learning computer software/program/algorithm aggregating the captured deviation data across the groups of users, resulting in aggregated deviation data. In an embodiment, the computer system is a robot aggregating the captured deviation data across the groups of users, resulting in aggregated deviation data. In an embodiment, the computer system is a cognitive computing platform aggregating the captured deviation data across the groups of users, resulting in aggregated deviation data. In an embodiment, the computer system is an artificial intelligence aggregating the captured deviation data across the groups of users, resulting in aggregated deviation data.

In a further embodiment, the executing further includes transmitting, by the computer system, the aggregated deviation data to at least one other user following a route similar to at least one segment of the generated optimal route. In an embodiment, the computer system is configured to transmit the aggregated deviation data to at least one other user following a route similar to at least one segment of the generated optimal route. In an embodiment, the computer system includes a computer system, such as computer system 400 as shown in FIG. 4, transmitting the aggregated deviation data to at least one other user following a route similar to at least one segment of the generated optimal route. In an embodiment, the computer system includes a computer system, such as computer system/server 412 as shown in FIG. 4, transmitting the aggregated deviation data to at least one other user following a route similar to at least one segment of the generated optimal route. In an embodiment, the computer system includes a computer system, such as processing unit 416 as shown in FIG. 4, transmitting the aggregated deviation data to at least one other user following a route similar to at least one segment of the generated optimal route.

In an embodiment, the computer system is implemented as computer software executing on a computer system, such as computer system 400 as shown in FIG. 4, such that the computer system transmits the aggregated deviation data to at least one other user following a route similar to at least one segment of the generated optimal route. In an embodiment, the computer system is implemented as computer software executing on a computer system, such as computer system/server 412 as shown in FIG. 4, such that the computer system transmits the aggregated deviation data to at least one other user following a route similar to at least one segment of the generated optimal route. In an embodiment, the computer system is implemented as computer software executing on a computer system, such as processing unit 416 as shown in FIG. 4, such that the computer system transmits the aggregated deviation data to at least one other user following a route similar to at least one segment of the generated optimal route. In an embodiment, the computer system transmits the aggregated deviation data to at least one other user following a route similar to at least one segment of the generated optimal route as computer software executing on a processor of the computer system.

In an embodiment, the computer system is a machine learning computer software/program/algorithm transmitting the aggregated deviation data to at least one other user following a route similar to at least one segment of the generated optimal route. In an embodiment, the computer system is a robot transmitting the aggregated deviation data to at least one other user following a route similar to at least one segment of the generated optimal route. In an embodiment, the computer system is a cognitive computing platform transmitting the aggregated deviation data to at least one other user following a route similar to at least one segment of the generated optimal route. In an embodiment, the computer system is an artificial intelligence transmitting the aggregated deviation data to at least one other user following a route similar to at least one segment of the generated optimal route.

In a further embodiment, the executing further includes adding, by the computer system, the aggregated deviation data to the supply chain optimization data. In an embodiment, the computer system is configured to add the aggregated deviation data to the supply chain optimization data. In an embodiment, the computer system includes a computer system, such as computer system 400 as shown in FIG. 4, adding the aggregated deviation data to the supply chain optimization data. In an embodiment, the computer system includes a computer system, such as computer system/server 412 as shown in FIG. 4, adding the aggregated deviation data to the supply chain optimization data. In an embodiment, the computer system includes a computer system, such as processing unit 416 as shown in FIG. 4, adding the aggregated deviation data to the supply chain optimization data.

In an embodiment, the computer system is implemented as computer software executing on a computer system, such as computer system 400 as shown in FIG. 4, such that the computer system adds the aggregated deviation data to the supply chain optimization data. In an embodiment, the computer system is implemented as computer software executing on a computer system, such as computer system/server 412 as shown in FIG. 4, such that the computer system adds the aggregated deviation data to the supply chain optimization data. In an embodiment, the computer system is implemented as computer software executing on a computer system, such as processing unit 416 as shown in FIG. 4, such that the computer system adds the aggregated deviation data to the supply chain optimization data. In an embodiment, the computer system adds the aggregated deviation data to the supply chain optimization data as computer software executing on a processor of the computer system.

In an embodiment, the computer system is a machine learning computer software/program/algorithm adding the aggregated deviation data to the supply chain optimization data. In an embodiment, the computer system is a robot adding the aggregated deviation data to the supply chain optimization data. In an embodiment, the computer system is a cognitive computing platform adding the aggregated deviation data to the supply chain optimization data. In an embodiment, the computer system is an artificial intelligence adding the aggregated deviation data to the supply chain optimization data.

Example

For example, for a cargo ship transporting goods from Los Angeles to Shanghai, the present invention could plan the route (an example of generated optimal route 190) for the cargo ship by using high level considerations such as weather (e.g., if it is typhoon season along the route, add three days to the shipping schedule) and standard ship channels (examples of variables of interest data 182). In addition, the present invention could plan for a delay if there were delays because of storms or ship maintenance (also examples of variables of interest data 182), where it is rare to make in-motion changes. The present invention could take into consideration factors (i.e., variables of interest data 182) such as but not limited to (a) real-time navigation actions from other ships on the same route, (b) real-time weather information, (c) real-time (ocean) current information, (d) risks to worker productivity (e.g., flu season, strikes, civil unrest), and (e) likelihood of maintenance problems. The present invention could provide a delivery estimate with appropriate contingency planning in place to maintain the estimated delivery date, possibly resulting in (i) more reliable delivery time, (ii) cost reductions/improved profitability through a reduction of penalties for late delivery, optimized labor costs, and/or a reduction of fuel consumption, and (iii) "just-in-time" route models.

In another example, for an airplane route from San Francisco to New York, the present invention could generate an original optimal route (i.e., generated optimal route 190) taking into consideration several variables such as weather along the route, the weight of the aircraft, and other flights intercepting that route (examples of variables of interest data 182). The present invention could then track and monitor the flight (resulting in monitored route execution data 192), identifying deviations from the original optimal route (i.e., captured deviation data 194) (e.g., identifying a deviation where the pilot decided to go down to 25,000-foot elevation over Chicago instead of the recommended 30,000-foot elevation). Next, the present invention could run updated route planning based on the actual measured variables at the time of the deviations (an example of revised optimal route 290). If the present invention were to conclude that the pilot made the flight change for a non-obvious reason, the present invention could record that deviation and could associate the deviation with a user group of the pilot. Further, the present invention could start making a recommendation about the deviation to other pilots if enough pilots were to make similar changes (an example of alternate route 390).

As another example, for delivery by truck, the present invention could generate an optimal route (i.e., generated optimal route 190) and transmit the optimal route to a truck driver. While most truck drivers would follow these instructions, the present invention could notice that a couple of truck drivers actually deviated from this route near a bridge crossing (i.e., captured deviation data 194). If the present invention were not able to explain the deviation by the truck drivers based on the variables in the model, the present invention could learn that there is value in this deviation, could capture the deviation, and, if other drivers were in the area, could recommend this deviation (i.e., alternate route 390) to the other drivers if the present invention were to find a match between the drivers (e.g., age, gender, personality).

Computer System

In an exemplary embodiment, the computer system is a computer system 400 as shown in FIG. 4. Computer system 400 is only one example of a computer system and is not intended to suggest any limitation as to the scope of use or functionality of embodiments of the present invention. Regardless, computer system 400 is capable of being implemented to perform and/or performing any of the functionality/operations of the present invention.

Computer system 400 includes a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 412 may be described in the general context of computer system-executable instructions, such as program modules, being executed by a computer system. Generally, program modules may include routines, programs, objects, components, logic, and/or data structures that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computer system 400 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions/operations of embodiments of the invention.

Program/utility 440, having a set (at least one) of program modules 442, may be stored in memory 428 by way of example, and not limitation. Exemplary program modules 442 may include an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the present invention.

Computer system/server 412 may also communicate with one or more external devices 414 such as a keyboard, a pointing device, a display 424, one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
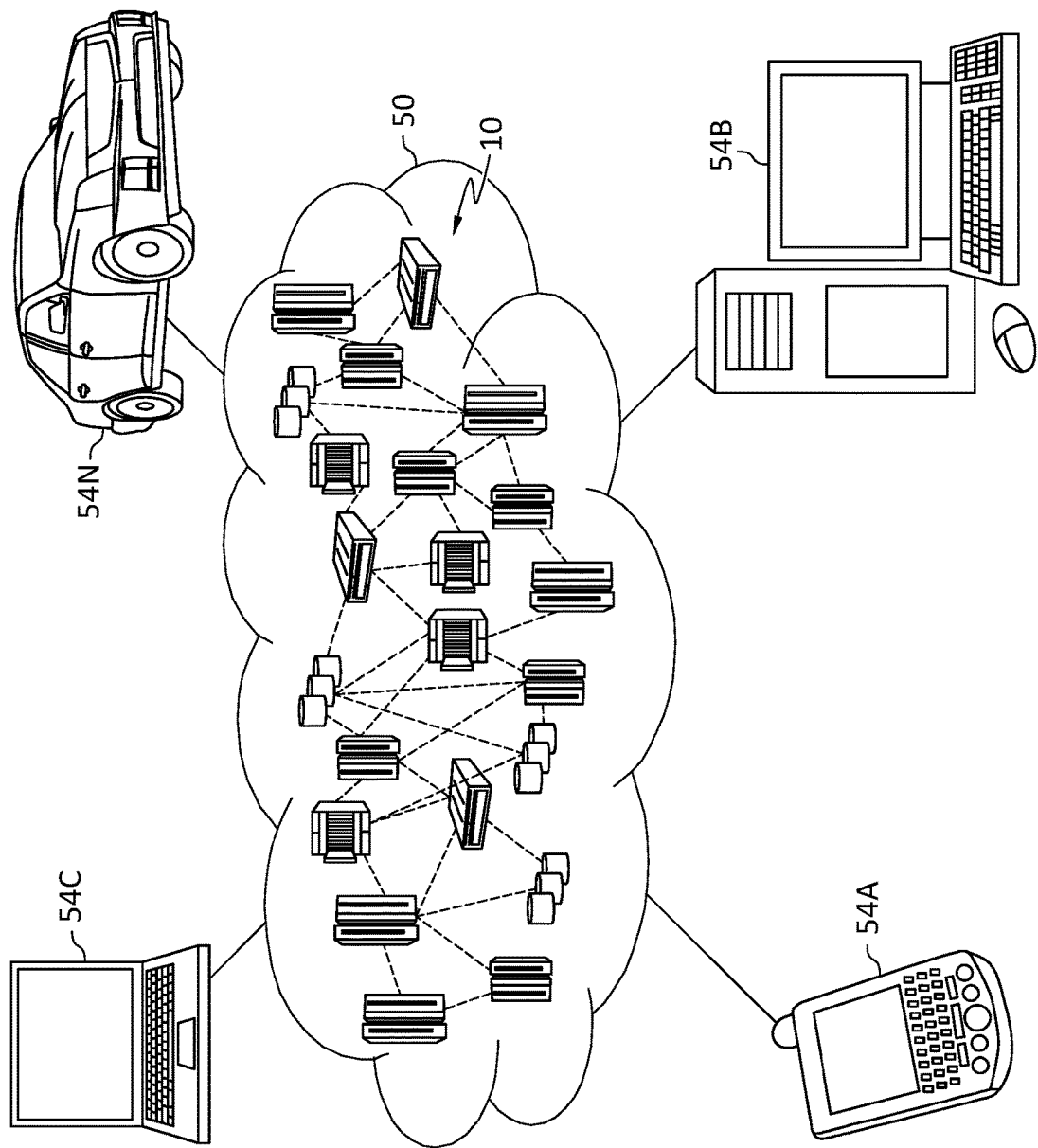
FIG. 5 depicts a cloud computing environment according to various embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
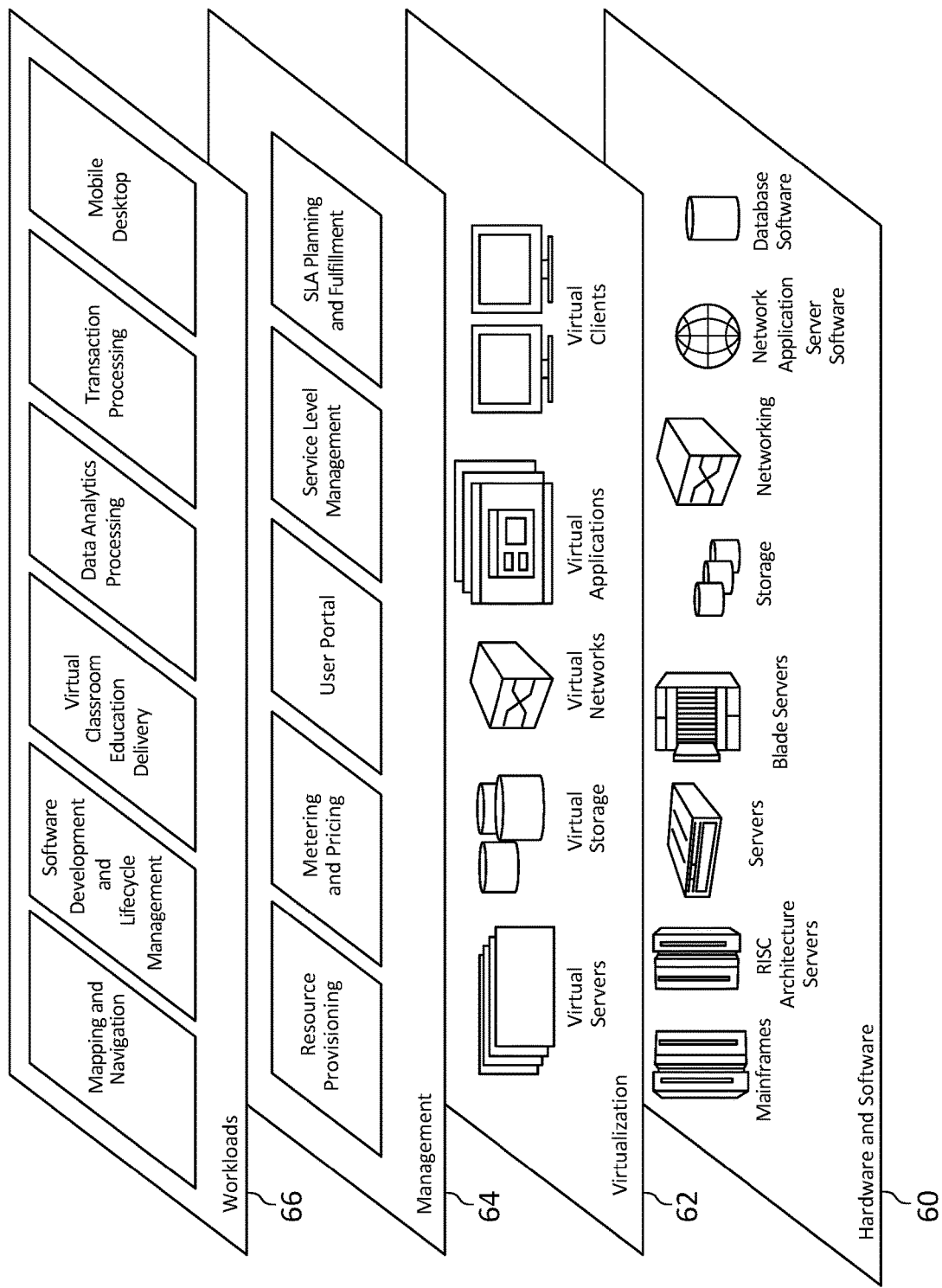
FIG. 6 depicts abstraction model layers according to various embodiments of the present invention.

Referring now to FIG. 6, a set of functional abstraction layers provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
    receiving, by a computer system, supply chain optimization data describing a supply chain optimization problem, wherein the computer system comprises a machine learning computer algorithm that executes a real-time cognitive supply chain optimization script;
    receiving, by the computer system, variables of interest data from a plurality of users;
    generating, by the computer system, an optimal route for a user based on the supply chain optimization data and the variables of interest data, resulting in a generated optimal route;
    monitoring, by the computer system, route execution data, resulting in monitored route execution data;
    capturing, by the computer system, deviation data from the monitored route execution data, resulting in captured deviation data;
    identifying whether at least one change occurred among the variables of interest at the time of the at least one deviation taken by the user; and
    in response to identifying by the computer system at least one change having occurred among the variables of interest at the time of the at least one deviation taken by the user, generating, by the computer system using the machine learning computer algorithm, a revised optimal route based on the captured deviation data, wherein the revised optimal route is continually optimized based on real-time conditions and information, and wherein the generating comprises:
        clustering the user and other users into groups based on metrics that may impact user choices regarding the optimal route; and
        aggregating results of manual adjustments made by the other users traveling the optimal route within a clustered group of users and across all clustered groups of users, wherein the results comprise at least whether the manual adjustments resulted in an improved route.

2. The method of claim 1 wherein the variables of interest data comprise real-time route action data describing real-time route actions taken by other users using routes similar to the generated optimal route, real-time weather data describing real-time weather along the generated optimal route, real-time environmental data describing real-time environmental conditions along the generated optimal route, real-time risk to worker productivity data describing risks to worker productivity in light of the generated optimal route, and real-time likelihood of maintenance problems data describing a likelihood of maintenance problems in light of the generated optimal route.

3. The method of claim 1 wherein the capturing the deviation data is with respect to critical variable data,
    wherein the critical variable data comprises time data related to the user and location data related to the user, and
    wherein the time data and the location data describe particular locations of the user with respect to the generated optimal route at particular times.

4. The method of claim 1 further comprising:
    transmitting, by the computer system, the revised optimal route to at least one other user following a route similar to at least one segment of the generated optimal route.

5. The method of claim 1 further comprising:
    in response to identifying by the computer system no change having occurred among the variables of interest at the time of the at least one deviation taken by the user, generating, by the computer system, an alternate route based on the captured deviation data; and
    transmitting, by the computer system, the alternate route to at least one other user following a route similar to at least one segment of the generated optimal route.

6. The method of claim 5 further comprising performing by the computer system, for a plurality of other users, the receiving, the generating, the monitoring, the capturing, the executing, and the transmitting, resulting in monitored route execution data of the plurality of other users and captured deviation data of the plurality of other users.

7. The method of claim 6 wherein the performing comprises executing, by the computer system, a set of logical operations clustering the user and the plurality of other users into groups of users based on metrics describing the user and the plurality of other users.

8. The method of claim 7 wherein the metrics comprise gender of the user and the plurality of other users, experience of the user and the plurality of other users, and personalities of the user and the plurality of other users.

9. The method of claim 7 further comprising executing, by the computer system, a set of logical operations aggregating the captured deviation data within the groups of users, resulting in aggregated deviation data.

10. The method of claim 9 further comprising transmitting, by the computer system, the aggregated deviation data to at least one other user following a route similar to at least one segment of the generated optimal route.

11. The method of claim 10 wherein the transmitting the aggregated deviation data comprises transmitting the aggregated deviation data to the at least one other user according to an affinity of the at least one other user with the groups of users.

12. The method of claim 9 further comprising adding, by the computer system, the aggregated deviation data to the supply chain optimization data.

13. The method of claim 7 further comprising executing, by the computer system, a set of logical operations aggregating the captured deviation data across the groups of users, resulting in aggregated deviation data.

14. The method of claim 13 further comprising transmitting, by the computer system, the aggregated deviation data to at least one other user following a route similar to at least one segment of the generated optimal route.

15. The method of claim 13 further comprising adding, by the computer system, the aggregated deviation data to the supply chain optimization data.

16. A system, wherein the system comprises a machine learning computer algorithm that executes a real-time cognitive supply chain optimization script, the system comprising:
- a memory; and
- a processor in communication with the memory, the processor configured to perform a method comprising:
  - receiving supply chain optimization data describing a supply chain optimization problem,
  - receiving variables of interest data from a plurality of users,
  - generating an optimal route for a user based on the supply chain optimization data and the variables of interest data, resulting in a generated optimal route,
  - monitoring route execution data, resulting in monitored route execution data,
  - capturing deviation data from the monitored route execution data, resulting in captured deviation data,
  - identifying whether at least one change occurred among the variables of interest at the time of the at least one deviation taken by the user, and
  - in response to identifying by the computer system at least one change having occurred among the variables of interest at the time of the at least one deviation taken by the user, generating, using the machine learning computer algorithm, a revised optimal route based on the captured deviation data, wherein the revised optimal route is continually optimized based on real-time conditions and information, and wherein the generating comprises:
    - clustering the user and other users into groups based on metrics that may impact user choices regarding the optimal route; and
    - aggregating results of manual adjustments made by the other users traveling the optimal route within a clustered group of users and across all clustered groups of users, wherein the results comprise at least whether the manual adjustments resulted in an improved route.

17. The system of claim 16 wherein the method further comprises:
- transmitting the revised optimal route to at least one other user following a route similar to at least one segment of the generated optimal route.

18. The system of claim 16 wherein the method further comprises:
- in response to identifying no change having occurred among the variables of interest at the time of the at least one deviation taken by the user, generating an alternate route based on the captured deviation data; and
- transmitting the alternate route to at least one other user following a route similar to at least one segment of the generated optimal route.

19. The system of claim 18 wherein the method further comprises performing, for a plurality of other users, the receiving, the generating, the monitoring, the capturing, the executing, and the transmitting, resulting in monitored route execution data of the plurality of other users and captured deviation data of the plurality of other users,
- wherein the performing comprises executing a set of logical operations clustering the user and the plurality of other users into groups of users based on metrics describing the user and the plurality of other users.

20. A computer program product comprising a computer readable storage medium having program instructions embodied therewith, the program instructions executable by a processor, the processor including a machine learning computer algorithm that executes a real-time cognitive supply chain optimization script, to cause the processor to perform a method comprising:
- receiving supply chain optimization data describing a supply chain optimization problem;
- receiving variables of interest data from a plurality of users;
- generating an optimal route for a user based on the supply chain optimization data and the variables of interest data, resulting in a generated optimal route;
- monitoring route execution data, resulting in monitored route execution data;
- capturing deviation data from the monitored route execution data, resulting in captured deviation data;
- identifying whether at least one change occurred among the variables of interest at the time of the at least one deviation taken by the user; and
- in response to identifying by the computer system at least one change having occurred among the variables of interest at the time of the at least one deviation taken by the user, generating, by the computer system using the machine learning computer algorithm, a revised optimal route based on the captured deviation data, wherein the revised optimal route is continually optimized based on real-time conditions and information, and wherein the generating comprises:
  - clustering the user and other users into groups based on metrics that may impact user choices regarding the optimal route; and
  - aggregating results of manual adjustments made by the other users traveling the optimal route within a clustered group of users and across all clustered groups of users, wherein the results comprise at least whether the manual adjustments resulted in an improved route.

* * * * *